(12) United States Patent
Koike et al.

(10) Patent No.: US 7,386,793 B2
(45) Date of Patent: Jun. 10, 2008

(54) APPARATUS, METHOD AND PROGRAM FOR SUPPORTING A REVIEW

(75) Inventors: Futoshi Koike, Sagamihara (JP); Gunji Tsukuda, Kawasaki (JP); Hiroshi Makita, Yokohama (JP); Shinji Noguchi, Kawasaki (JP); Kenichi Kotou, Ichikawa (JP); Hideaki Ikuta, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 294 days.

(21) Appl. No.: 10/787,111

(22) Filed: Feb. 27, 2004

(65) Prior Publication Data
US 2004/0237041 A1 Nov. 25, 2004

(30) Foreign Application Priority Data
May 21, 2003 (JP) ............................. 2003-142840

(51) Int. Cl.
*G06F 17/00* (2006.01)
(52) U.S. Cl. ...................... 715/512; 715/511; 715/516; 715/526; 235/375
(58) Field of Classification Search ................ 715/512, 715/530, 511, 516, 526; 235/375
See application file for complete search history.

(56) References Cited

U.S. PATENT DOCUMENTS 6,243,722 B1 * 6/2001 Day et al. .................... 715/512
6,796,486 B2 * 9/2004 Ohashi ........................ 235/375
7,028,267 B1 * 4/2006 Beezer et al. ............... 715/802

FOREIGN PATENT DOCUMENTS

| JP | 6203024 | 7/1994 |
|---|---|---|
| JP | 6-274493 | 9/1994 |
| JP | 6274493 | 9/1994 |
| JP | 7-146860 | 6/1995 |
| JP | 7311764 | 11/1995 |
| JP | 11053361 | 2/1999 |
| JP | 2000/339299 | 12/2000 |
| JP | 2002/2108898 | 4/2002 |

* cited by examiner

*Primary Examiner*—Stephen Hong
*Assistant Examiner*—Matthew J. Ludwig
(74) *Attorney, Agent, or Firm*—Mattingly, Stanger, Malur & Brundidge, P.C.

(57) ABSTRACT

When a comment and a solution thereagainst are described in any one of a review document, a minute and a pending issue list, a reflecting unit reflects the comment and solution upon a corresponding portion of the document associated with the contents of the comment and solution. When, in connection with the review document, minute and pending issue list to be prepared during review, a specified comment or solution is selected on an editing screen of a system for editing each of the review document, minute and pending issue list, information about positions at which the comment and solution are post-scribed is acquired from a comment-solution management table and displayed on the editing screen of a associated system.

20 Claims, 20 Drawing Sheets

OUTLINE OF THE INVENTION

FIG. 3

POSITION ATTRIBUTE MANAGEMENT TABLE

| TYPE | CLASSIFICATION A | CLASSIFICATION B | ATTRIBUTE A | ATTRIBUTE B | ATTRIBUTE C | ATTRIBUTE D | ATTRIBUTE E | ATTRIBUTE F |
|---|---|---|---|---|---|---|---|---|
| TEXT | COMPOSITION | TEXT | START PAGE | START LINE | START COLUMN | END PAGE | END LINE | END COLUMN |
| FIGURE | | FIGURE | CORRESPONDING PAGE | SEQUENCE | | | | |
| TABLE | | TABLE | CORRESPONDING PAGE | SEQUENCE | UPPERMOST LINE | LEFTMOST COLUMN | LOWERMOST LINE | RIGHTMOST COLUMN |
| COMMENT | | COMMENT | CORRESPONDING COMMENT | | | | | |
| SOLUTION | | SOLUTION | CORRESPONDING SOLUTION | | | | | |

FIG. 4

COMMENT-SOLUTION MANAGEMENT TABLE (116)

| ID (401) | CLASSIFI-CATION (402) | OBJECT (403) | TYPE (404) | AT-TRIBUTE A (405) | AT-TRIBUTE B (406) | AT-TRIBUTE C (407) | AT-TRIBUTE D (408) | AT-TRIBUTE E (409) | AT-TRIBUTE F (410) | CONTENTS (411) |
|---|---|---|---|---|---|---|---|---|---|---|
| COMMENT A1 | COMMENT | Doc | TEXT | 3 | 5 | 6 | 3 | 7 | 15 | CONTENTS 1 |
| COMMENT A2 | COMMENT | Doc | FIGURE | 4 | 2 | | | | | CONTENTS 2 |
| SOLUTION A1 | SOLUTION | Doc | COMMENT | COMMENT A1 | | | | | | CONTENTS 3 |

412 — (COMMENT A1, COMMENT A2 rows)
413 — (SOLUTION A1 row)

POSTSCRIPT OF
COMMENT TO REVIEW DOCUMENT 202

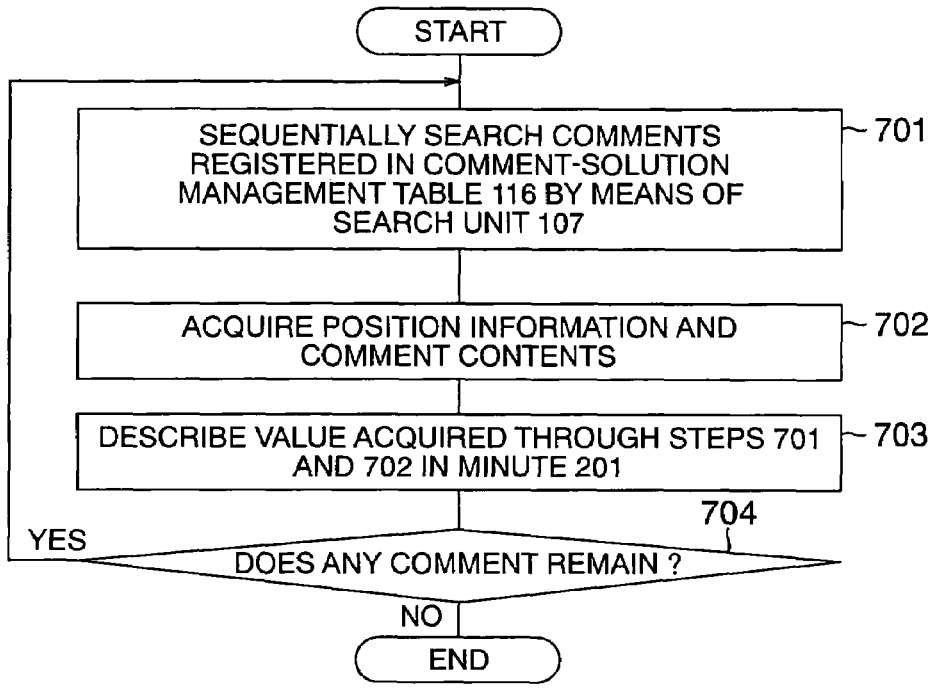
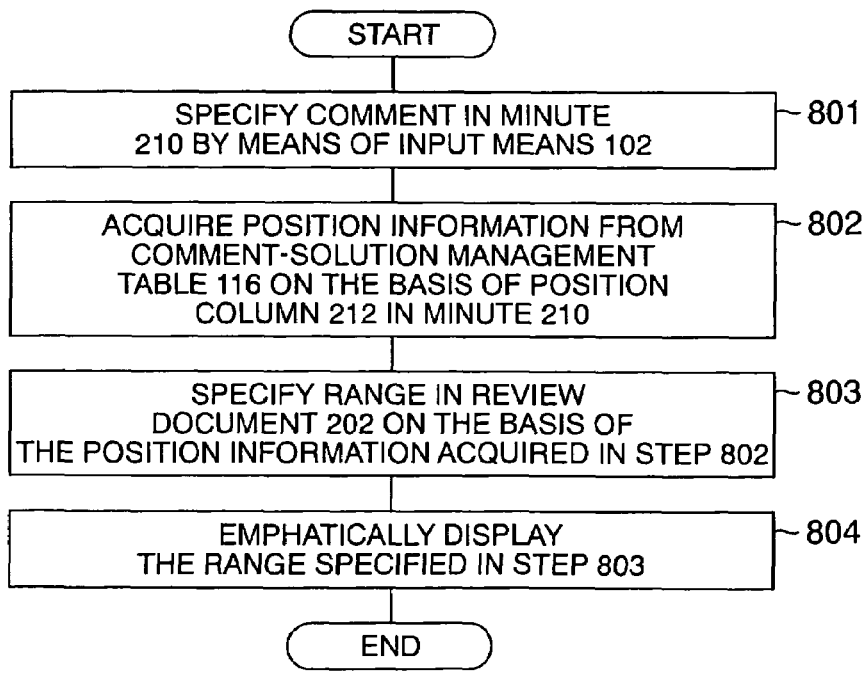

PROCESS FLOW OF SELECTING COMMENT RANGE IN REVIEW DOCUMENT 202 AND EMPHATICALLY DISPLAYING CORRESPONDING COMMENT IN MINUTE 210

PROCESS FLOW OF DISPLAYING SOLUTION DESCRIBED IN MINUTE 210 BY CORRELATING IT TO REVIEW DOCUMENT 202

PROCESS FLOW OF DISPLAYING SOLUTION DESCRIBED IN PENDING ISSUE LIST 218 BY CORRELATING IT TO REVIEW DOCUMENT 202

PROCESS FLOW OF SELECTING SOLUTION IN PENDING ISSUE LIST 218 AND EMPHATICALLY DISPLAYING CORRESPONDING COMMENT RANGE IN REVIEW DOCUMENT 202

PROCESS FLOW OF SELECTING COMMENT RANGE IN REVIEW DOCUMENT 202 AND EMPHATICALLY DISPLAYING CORRESPONDING SOLUTION IN PENDING ISSUE LIST 218

PROCESS FLOW OF SELECTING COMMENT IN MINUTE 210 AND EMPHATICALLY DISPLAYING CORRESPONDING SOLUTION IN PENDING ISSUE LIST 213

FIG. 16

DIFFERENCE MANAGEMENT TABLE — 1503

| ID (1601) | OBJECT DOCUMENT (1602) | REFLECTION POSITION (1603) | REFLECTION SOURCE CONTENTS (1604) |
|---|---|---|---|
| 1 | DocA | TEXT AA1 | TEXT A1 |
| 2 | DocA | FIGURE AA2 | FIGURE A2 |
| 3 | DocA | TABLE AA3 | TABLE A3 |

1605

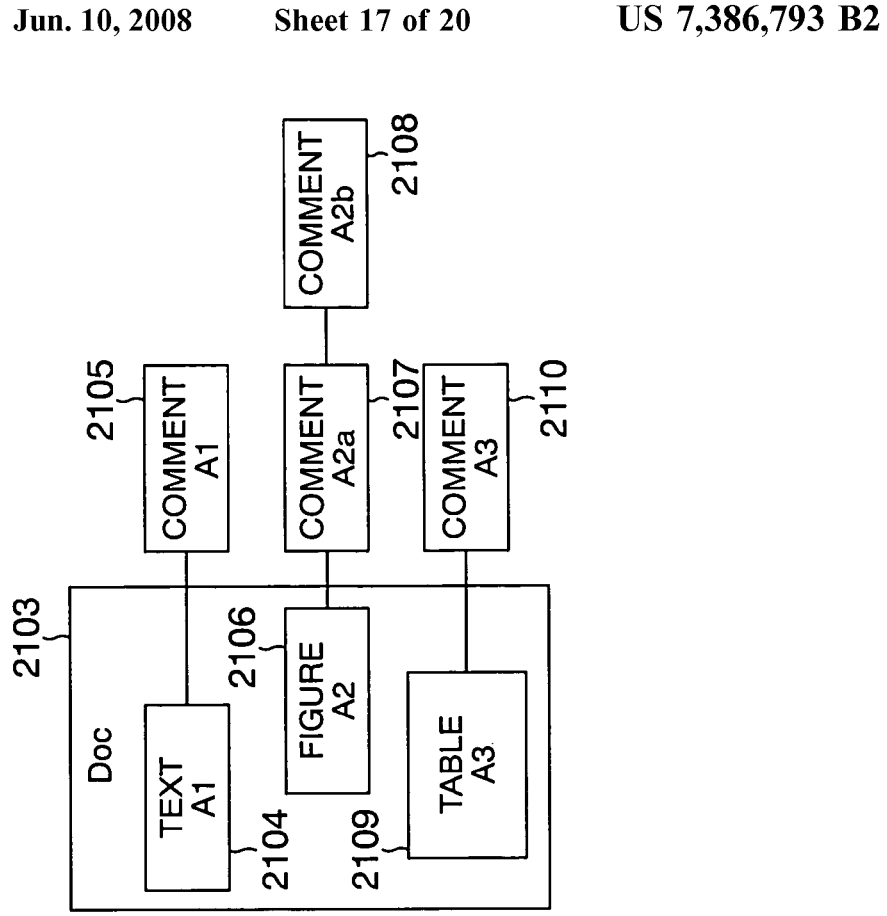
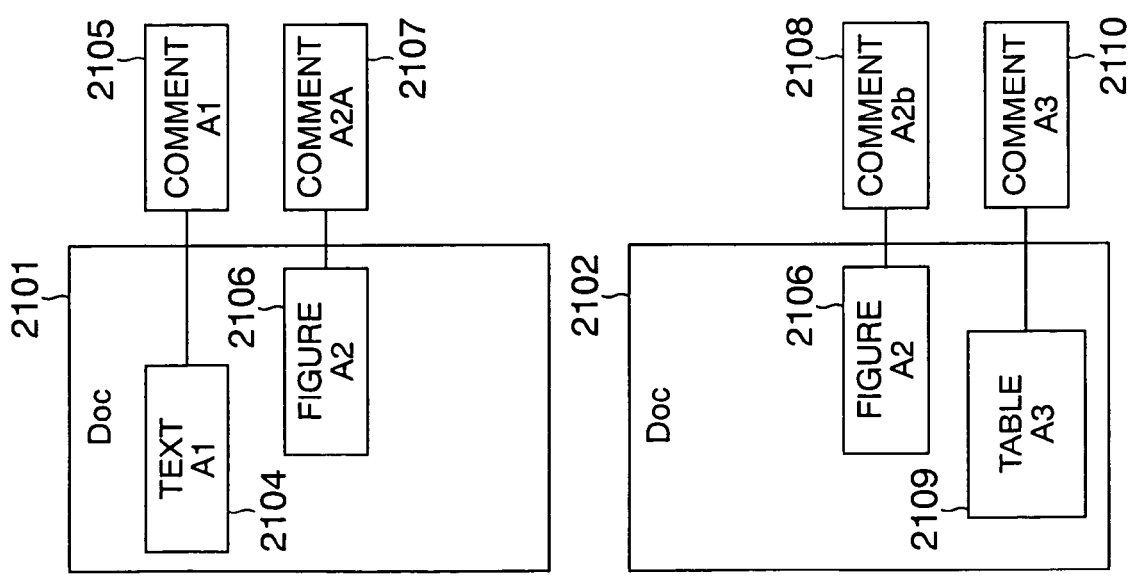
FIG. 21
MERGING OF COMMENTS FROM PLURAL REVIEWERS TO REVIEW DOCUMENT 202

PROCESS FLOW OF GENERATING INSTRUCTION 2401

PROCESS FLOW OF ANALYZING INSTRUCTION 2401

APPARATUS, METHOD AND PROGRAM FOR SUPPORTING A REVIEW

BACKGROUND OF THE INVENTION

The present invention relates to apparatus, method and program for supporting review of materials (documents or the like) and more particularly to apparatus, method and program for efficiently performing a series of work operations such as review, minutes preparation, pending issue management, and correction of review documents.

JP-A-7-146860 discloses that pieces of information for review of a designated document by a plurality of reviewers are taken out in accordance with a display command so that, on the basis of position information in these pieces of review information, a corresponding display position in original document displayed on the screen may be determined to make a display area vacant and the review information may be displayed in the vacant display area, and that it is commanded whether the review information by the plural reviewers displayed on the original document in correspondence with the reviewers is adoptable or non-adoptable and the display form is changed in accordance with the adoption or non-adoption so that only review contents commanded as being adoptable may be extracted to correct the original document in accordance with the review information.

JP-A-6-274493 discloses a document management apparatus in which a plurality of document review processors used by a plurality of document review members to perform review work are mutually connected through a network, one of the plurality of document review processors is defined as a server having a common comment database prepared and used in review work, the server and the plural document review processors constituting the document management apparatus, wherein each of the plurality of document review processors includes review member managing means for managing access to the database of the server from review members cooperatively participating in work of reviewing individual review object documents, means for enabling an examinatorial reader to prepare comments necessary for review, answer preparing means for enabling an answerer to make a response to a comment, comment searching means for searching only a necessary comment from a large amount of comment data, comment display means for adjusting retrieved results and displaying them, comment managing means for managing comments prepared by a plurality of examinatorial readers and data of answers prepared by a plurality of answerers and for printing review results, and review notifying means for managing forwarding of various notice documents necessary for adjusting the work between the review members.

In review, obscurities in a review object document and a solution thereagainst must be clarified. In addition, a series of work operations of putting together the review results in a minutes and a pending issue list and eventually correcting the review object document must be fulfilled.

The aforementioned prior arts, however, fail to describe that a system (application) for editing an object document into which comments are to be inserted differs from a system (application) for displaying and editing the comments collectively. Further, none of the aforementioned prior arts disclose a plurality of object documents prepared by different systems (applications).

Further, in the JP-A-7-146860, review information can be post-scribed in a specified range in a review document but the review information is information for document substitution by which adoption or non-adoption of the review document is determined.

With the JP-A-6-274493, when such work as examinatorial read request, examinatorial read completion, answer request and answer completion is carried out through mail notification, interchange of mails is necessary for a participant to prosecute examinatorial read work. Accordingly, for performing examinatorial read, at least four mail interchange operations of examinatorial read request, examinatorial read completion, answer request and answer completion are necessary. In other words, a considerable amount of work operations are needed for examinatorial read. Further, much time is lost in interchange of mails. In addition, to respond to a comment, a review reader selects an answerer and forwards a mail to the answerer. In failure to obtain any answer, work for reselecting another answerer is needed and expectantly, re-work operations will be done many times.

SUMMARY OF THE INVENTION

An object of the invention is to provide review support apparatus, method and program capable of allowing a user to perform review efficiently and improving the quality of review documents.

According to one feature of the invention, a position attribute management table is provided which is adapted for collectively managing different pieces of position information in order to cooperate different systems (applications). The position attribute management table can define what acquisition items (attributes) the information of a position at which a comment is filled in is expressed by, in respect of individual applications (individual document classes). By changing this definition, various kinds of applications can be dealt with. Then, a position information acquiring unit consults the position attribute management table to acquire the position information defined as a comment position attribute and stores the position information in a comment-solution management table to manage it.

According to the present invention, the user can carry out review efficiently and the quality of a review object material can be improved.

Other objects, features and advantages of the invention will become apparent from the following description of the embodiments of the invention taken in conjunction with the accompanying drawings.

BRIEF DESCRIPTION OF THE DRAWINGS

FIG. 3 shows a position attribute management table 115.

FIG. 4 shows a comment-solution management table 116.

FIG. 7 shows the flow of a process for reflecting a comment post-scribed in the review document 202 upon minutes 210.

FIG. 8 shows the flow of a process for selecting a comment in the minutes 210 and emphatically displaying a corresponding comment range and the comment in the review object document 202.

FIG. 16 shows a difference management table 1503 in the invention.

FIG. 21 shows the concept of merging the comments from the plural viewers to the review document 202 in the invention.

DETAILED DESCRIPTION OF THE EMBODIMENTS OF THE INVENTION

The present invention will now be described by way of example with reference to the accompanying drawings.

In order to integrate different systems, there needs a scheme capable of separately acquiring position information the individual applications manage internally. With the aid of only an address of a document, it is impossible to decide where comments are added and besides the individual applications typically have position information in different ways, giving rise to the necessity of a scheme capable of collectively managing different pieces of position information for the purpose of performing cooperation. Accordingly, in the present invention, a position attribute management table is prepared. The position attribute management table can give a definition as to what attributes are used in respect of individual applications (individual document classes) to express the position information (range) in which comments are to be written. By changing the definition, a variety of applications can be dealt with. Then, a position information acquiring unit consults the position attribute management table to acquire position information defined as a comment position attribute and records the position information on a comment-solution management table to manage it. As described above, by managing the position through the use of two tables of position attribute management table and comment-solution table, pieces of information of different systems can be acquired/operated at a time. Accordingly, even review object materials prepared by different applications can be cooperated with a review support apparatus by merely defining attributes of position information in a position attribute definition table. Further, the number of applications to be cooperated concurrently is not limited.

Figure 1:
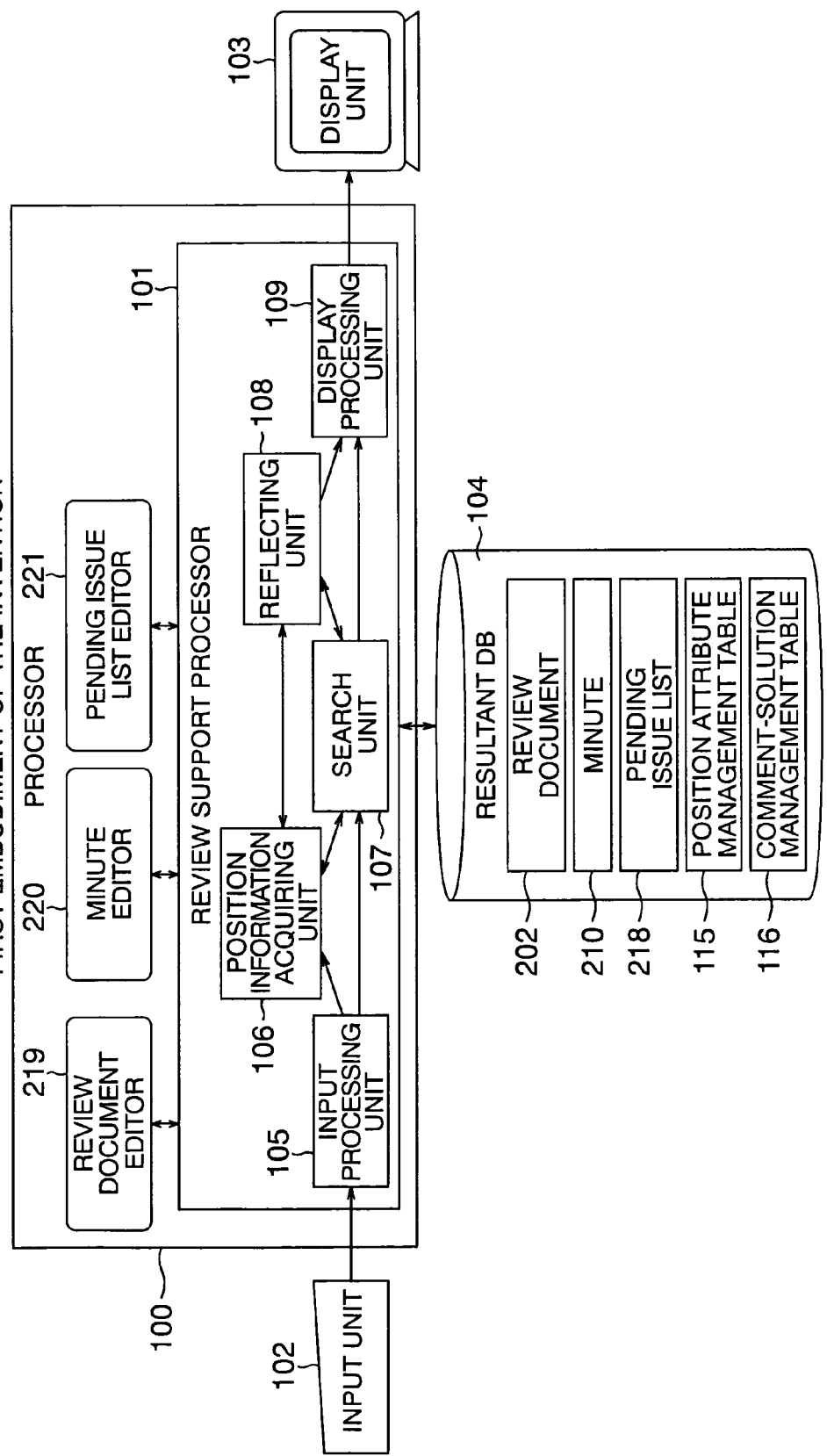
FIG. 1 shows the configuration of an apparatus according to a first embodiment of the invention.

Referring to FIG. 1, an apparatus according to a first embodiment of the invention is constructed as shown therein in block diagram form. An information processing apparatus (computer) comprises a processor 100 (for example, a CPU or the like) for executing individual processes (individual steps) in accordance with a program, an input unit 102 (for example, a keyboard, mouse or the like) for receiving an input from a user and transmitting its input information to the processor 100, a display unit 103 for visually displaying display information from the processor 100, and a resultant DB 104 (for example, a hard disk) for accumulating s review object document or the like. The processor 100 includes a review object document editor 219 for editing a review object document, a minutes editor 220 for editing a minutes, a pending issue list editor 221 for editing a pending issue list, and a review support processor 101 for supporting review. The review support processor 101 has an input processing unit 105 for fetching input information from the input unit 102, a position information acquiring unit 106 for acquiring a position in a review object composition, a search unit 107, a reflecting unit 108 and a display processing unit 109 for controlling the screen on which an object to be edited is displayed. Each of the above-mentioned units is implemented as the processor 100 operates in accordance with a program. The display processing unit 109 can also permit a plurality of display units 103 to be used as picture display screens. The resultant DB 104 centrally manages a review object document 202, minutes 210 adapted to put together comments (for example, comments and solutions) on a composition in the review object document 202, a pending issue list 218 adapted to manage outstanding items or pending issues in the minutes 210, a position attribute management table 115 for defining items to be acquired as position information, and a comment-solution management table 116 adapted to put together solutions against comments. The review document editor 219', minutes editor 220', pending issue list editor 221' and review support processor 101 may be either the same application or different applications.

Figure 2:
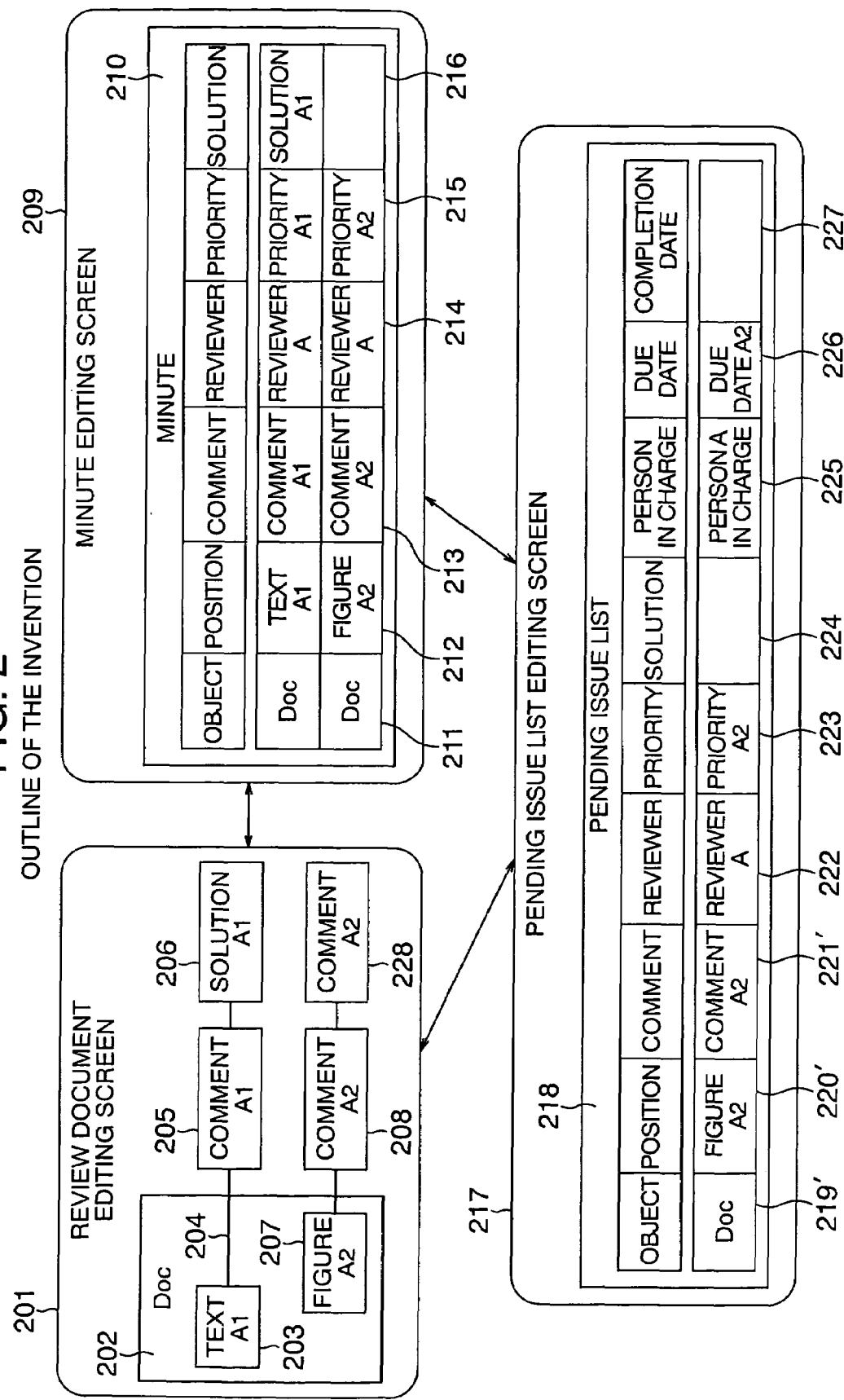
FIG. 2 shows display screens in the present invention.

Referring to FIG. 2, pictures as displayed on screens are shown according to the first embodiment of the invention. A review object document editing screen 201 is a display screen of a subsystem for editing the review object document 202. A minutes editing screen 209 is a display screen of a system for editing the minutes 210. A pending issue list editing screen 217 is a display screen of a subsystem for editing the pending issue list 218. When recognizing that, for example, a composition in the review object document 202 is irrational, a user (reviewer) writes a comment 205 in the composition at a position (for example, comment range 203). The range in which the comment 205 can be postscribed is a composition, a table, a figure or the like in the review object document 202. The position information acquiring unit 106 manages the comment range 203 by using attributes shown in the position attribute management table 115. The display processing unit 109 generates these screens.

Turning to FIG. 3, the position attribute management table 115 for defining position information in the first embodiment of the invention is configured as shown therein. Type 301 represents a column for describing type definitions of an attribute set used for expressing position information, that is, a column for describing acquisition items of position information in the review object. Classification A 302 is a column for describing the class of an application used during preparation of the review object document 202. For example, a word processor, a graphic application or the like sorted into this class. Classification B 303 is a column for describing the class of an object prepared by utilizing the classification A 302. For example, a composition, a figure, a table or the like is sorted into this class. In the classification B 303, "comment" or "solution" to be described later can also be designated. By defining the type 301 in respect of each of the classification A 302 and classification B 303 in this manner, position information having various units can be expressed. Also, when defining the type 301 through the medium of the input unit 102, the user can freely select an application for editing the review object document 202. Attribute A 304, attribute B 305, attribute C 306, attribute D 307, attribute E 308 and attribute F 309 are columns for describing attributes serving as actual position information in accordance with the definition of type. For example, a type definition 310 having a value of "text" in type 301 connects to "composition" in classification A 302 to indicate that this is prepared with a word processor and then to "text" in classification B 303 to indicate that the range of designation is a text. Through this, the unit indicating the position information is determined and a start page is described in attribute A 304, a start line is described in attribute B 305, a start column is described in attribute C 306, an end page is described in attribute D 307, an end line is described in attribute E 308 and an end column is described in attribute F 309. By utilizing the "type" of position information, the review object document 202 can be correlated to a comment. Pieces of information as to how the review object document 202 is correlated to comments are put together in the comment-solution table 116. The position attribute management table 115 is defined in advance by the user and stored in the resultant DB 104.

Referring now to FIG. 4, the comment-solution management table 116 in the first embodiment of the invention is structured as shown therein. ID 401 is a column for describing ID's. An ID is identification information given by the position information acquiring unit 106 to a comment or a solution and has a value which is uniformly or definitely discriminative. Classification 402 is a column for indicating that an object to be managed is either a comment or a solution. Object 403 is a review object document to which a comment or solution is post-scribed. Type 404 is a column for describing the type by which position information is expressed and has any value in the type 301 in the position attribute management table 115. Attribute A 405, attribute B 406, attribute C 407, attribute D 408, attribute E 409 and attribute F 410 are columns described with concrete numerical values of position information in accordance with the type 301 in the position attribute management table 115. Contents 411 is a column for describing concrete contents of comments. For example, it will be appreciated that comment information 412 having a value of "comment A1" in the ID 401 is for applying an "comment" to an object "Doc", has its position information of the type "text", starts from "3" page, "5" line and "6" column so as to be targeted to a range of "3" page, "7" line and "15" column and has its contents of "contents 1". In this manner, the comment can be post-scribed into the review object document 202. The comment post-scribed in the review object document 202 is displayed on the review object document editing screen 201 by using a correlation line 204.

Figure 5:
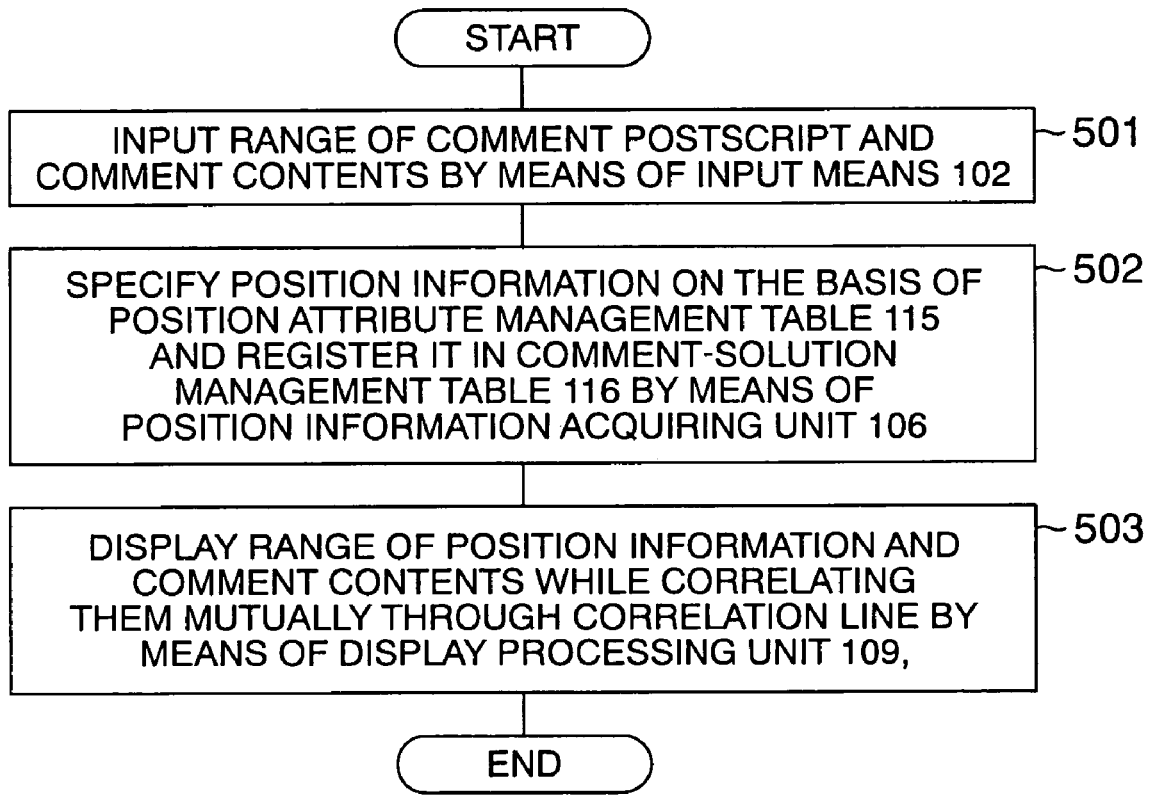
FIG. 5 shows the flow of a process for displaying a comment post-scribed in a review document 202 on a review document editing screen 201.

Referring to FIG. 5, there is shown the flow of a process for displaying, on the review object document editing screen 201, a comment post-scribed in the review object document 202 in the first embodiment of the invention. In step 501, an input of a range of comment postscript and comment contents is received by means of the input unit 102. In step 502, the position information acquiring unit 106 specifies position information on the basis of the position attribute management table 115 in the resultant DB 104 and registers (records) the specified position information in the comment-solution management table 116 in the resultant DB 104. More specifically, the position information acquiring unit 106 specifies classification A 302 and classification B 303 from the review object document editor 219 and consults attributes in resultant DB 104 corresponding to the specified classification A 302 and classification B 303 to acquire position information from the review document editor 219. In step 503, the display processing unit 109 displays the range of position information and the comment contents while correlating them mutually through the correlation line. It is to be noted that the correlation is carried out between the two items of position information range and comment contents and is not limited to the one to one relation. A plurality of comments may be correlated to one range or conversely, one comment may be correlated to a plurality of ranges.

Figure 6:
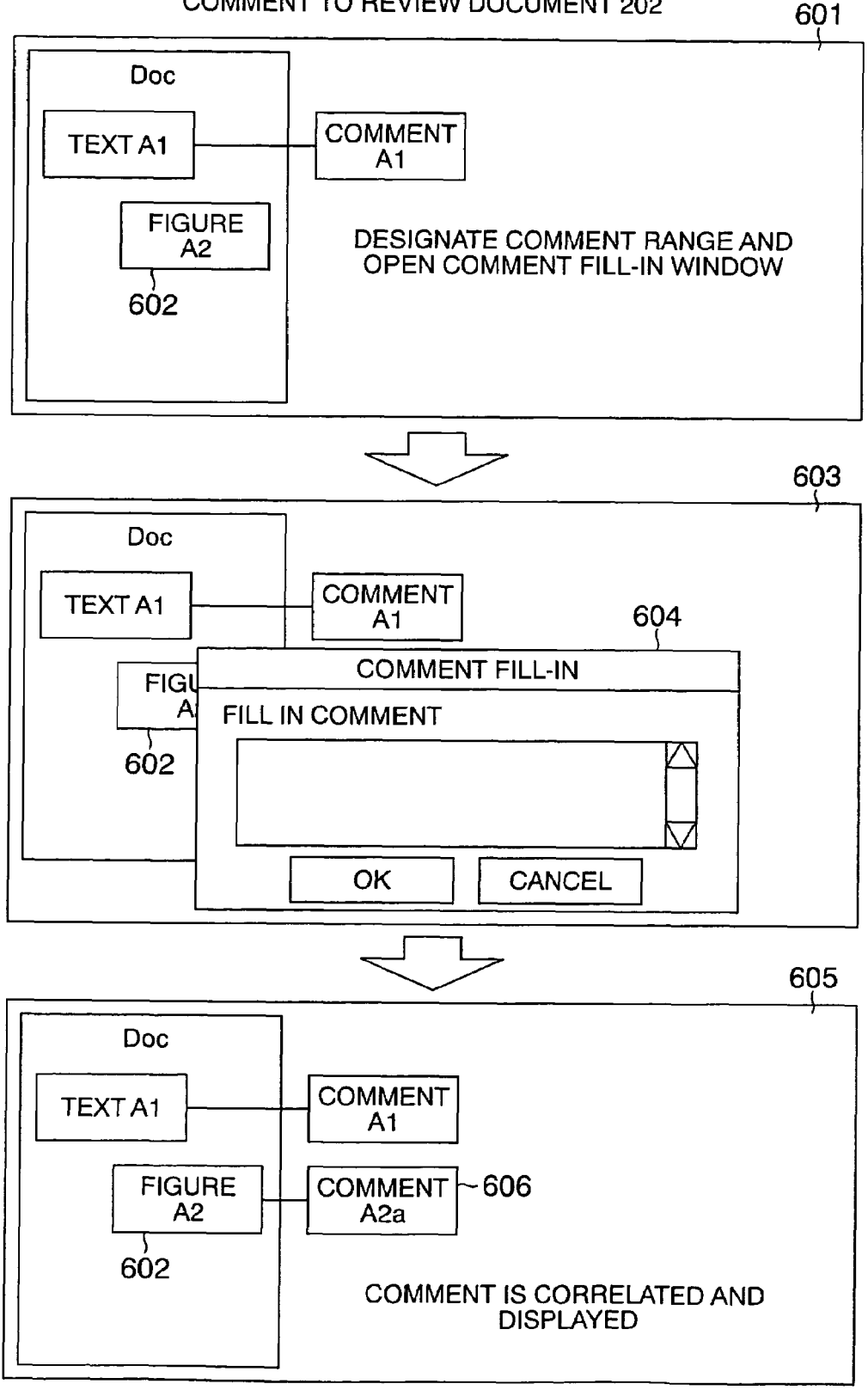
FIG. 6 shows transition of the display screen for post-scribing comments in the review document 202.

Turning now to FIG. 6, there is illustrated an example of postscript of a comment to the review object document 202. In screen 601, "figure A 2" is selected in a designated range 602. In screen 603, the contents of a comment is filled in. A dialog 604 is opened so that the comment can be filled in along guidance. In screen 605, the comment contents post-scribed on the screen 603 is displayed as comment 606 in correlation to the comment range 602.

Reverting to FIG. 2, the comment post-scribed to the review object document 202 is reflected upon the minutes 210. The minutes 210 is a table having columns of object 211, position 212, comment 213, reviewer 214, priority 215 and solution 216. Described in the object 211 are documents to be reviewed. Described in the position 212 are ID's 401 to be managed by the comment-solution management table 116. To acquire concrete values of position information, the comment-solution management table 116 is consulted by using the ID's 401 as key. Described in the comment 213 is comment contents. Described in the reviewer 214 are names of reviewers having made the comments. Information of the name of reviewer is recorded as a possessor of the document on the review object document when the comment is post-scribed to the review object document 202. Considering the importance of a post-scribed problem, the user can describe in the priority 215 the priority order of matters to be discussed during review through the medium of the input unit 102. The minutes editing screen 209 also has a function of sorting lines in the minutes 210 by using a value of the priority 215 as key. Of course, comments can also be sorted in accordance with the sequence of their description in the review object document. Described in the solution 216 are solutions against comments discussed during review.

Referring now to FIG. 7, there is illustrated the flow of a process for reflecting the comment post-scribed to the review object document 202 upon the minutes 210.

In step 701, comments registered in the comment-solution management table 116 are retrieved sequentially. In step 702, position information and comment contents of a comment retrieved in the step 701 are acquired from the comment-solution management table 116. In step 703, a value acquired through the steps 701 and 702 is described in a corresponding column in the minutes 210 by means of the reflecting unit 108. In step 704, it is decided whether any comment remains. If so, the program returns to the step 701 but if not so, the process ends. It is to be noted that in the minutes 210, the reviewer 214, priority 215 and solution 216 are not always necessary.

Reverting to FIG. 2, when a comment described in the minutes 210 is selected on the minutes editing screen 209, the minutes editor 220 specifies a range in review object document 202 corresponding to the selected comment and displays it emphatically on the review object document editing screen 201.

Figure 9:
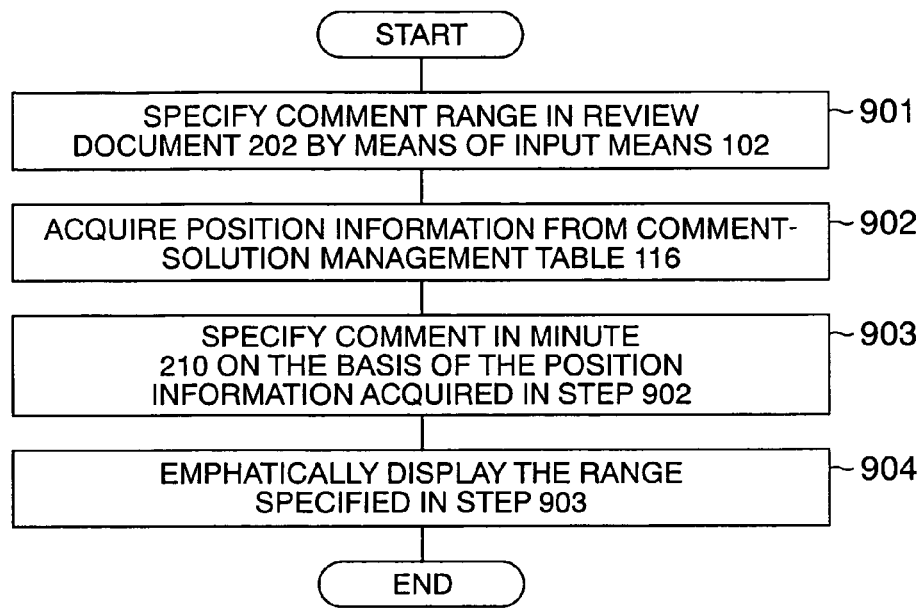
FIG. 9 shows the flow of a process for selecting a comment range in the review document 202 and emphatically displaying a corresponding comment in the minutes 210.

When a comment in the minutes 210 is selected, a corresponding comment range in the review object document 202 and the comment are emphatically displayed according to a process flow as shown in FIG. 8. In step 801, the input unit 102 specifies a comment in the minutes 210. In step 802, position information is acquired from the comment-solution management table 116 on the basis of a position 212 in minutes 210 specified in the step 801. In step 803, a range in the review object document 202 is specified on the basis of the position information acquired in the step 802. In step 804, the range specified in the step 803 is emphatically displayed by means of the display processing unit 109. Conversely to the above, when a range in which a comment is post-scribed to the review object document 202 is selected on the review object document editing screen 201, a corresponding comment described in the minutes 210 can be specified and emphatically displayed on the minutes editing screen 209. With the comment range in the review object document 202 selected, a corresponding comment in the minutes 210 is emphatically displayed according to a process flow as shown in FIG. 9. In step 901, the input unit 102 specifies a comment range in the review object document 202. In step 902, position information is acquired from the comment-solution management table 116 on the basis of the comment specified in the step 901. In step 903, a comment in the minutes 210 is specified on the basis of the position information acquired in the step 902. In step 904, the range specified in the step 903 is emphatically displayed by means of the display processing unit 109.

Reverting to FIG. 2, users hold a discussion during review on the basis of a comment described at comment 213 in the minutes 210 and record a solution, as a result of the discussion, against the comment at solution 216. The minutes editor 220 causes the comment-solution management table 116 to also record the solution described at solution 216. For example, a solution A1 having a value of ID 413 connects to an object 403 of Doc, corresponding to a comment A1 at attribute A 405 and having contents 3 at contents 411. The minutes editor 220 can display a solution described at solution 216 by making it correlated to a comment displayed on the review object document editing screen 201.

Figure 10:
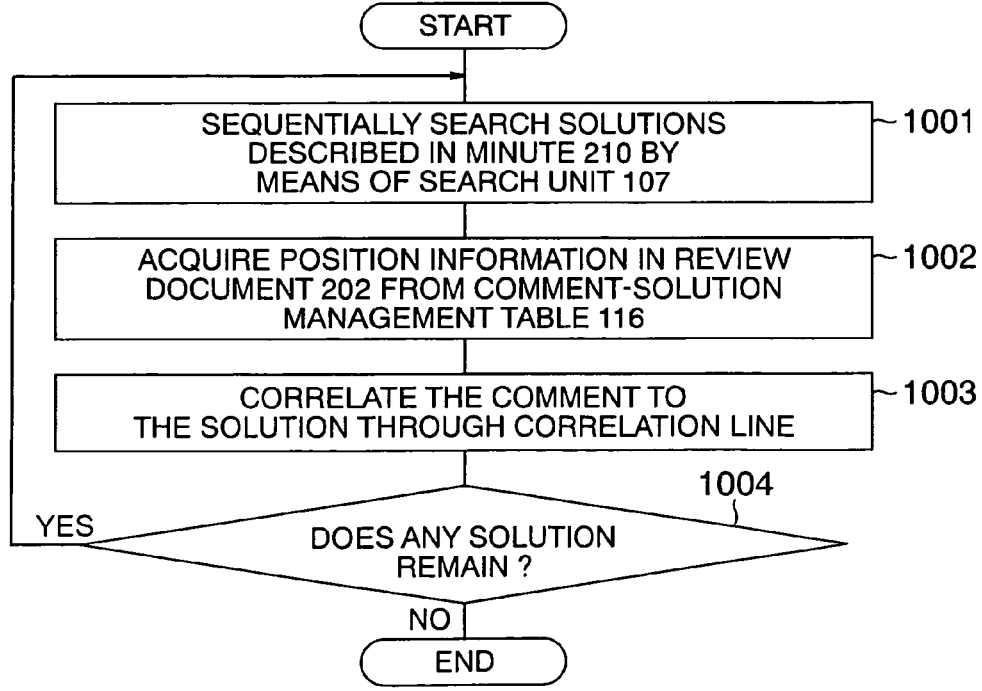
FIG. 10 shows the flow of a process for displaying a solution described in the minutes 210 while correlating it to the review document 202.

Referring now to FIG. 10, there is illustrated the flow of a process for displaying the solution described at solution 216 by correlating it to the review object composition 202. In step 1001, the search unit 107 sequentially searches solutions described in the minutes 210 in resultant DB 104. In step 1002, position information in the review object document 202 is acquired from the comment-solution management table 116. In step 1003, the comment is correlated to the solution by means of the reflecting unit 108. In step 1004, it is decided whether any solution remains and if so, the program returns to the step 1001 but if not so, the process ends.

Reverting to FIG. 2, in connection with comments for which no solutions are settled during review, the pending issue list editor 221 records the comments as pending issues on the pending issue list 218. The users discuss the pending issues separately after review by consulting the recorded pending issues. Structurally, the pending issue list 218 adds to the minutes 210 a person 225 in charge of pending issue, a due date 226 of pending issue and a date 227 of completion of solution against pending issue. Object 219', position 220', comment 221', reviewer 222, priority 223 and solution 224 have the same meaning as the object 211, position 212, comment 213, reviewer 214, priority 215 and solution 216 in the minutes 210, respectively. After the review ends, in connection with lines in minutes 210 for which no solutions 216 are settled, values of object 219', position 220', comment 221', reviewer 222 and priority 223 are replicated with values of object 211, position 212, comment 213, reviewer 214 and priority 215, respectively, and the person 225 in charge and due date 226 are newly filled in. Then, when solutions against the comments are settled, the solution 224 and completion date 227 are filled in. The solutions filled in the pending issue list 218 can be reflected upon the review object document 202.

Figure 11:
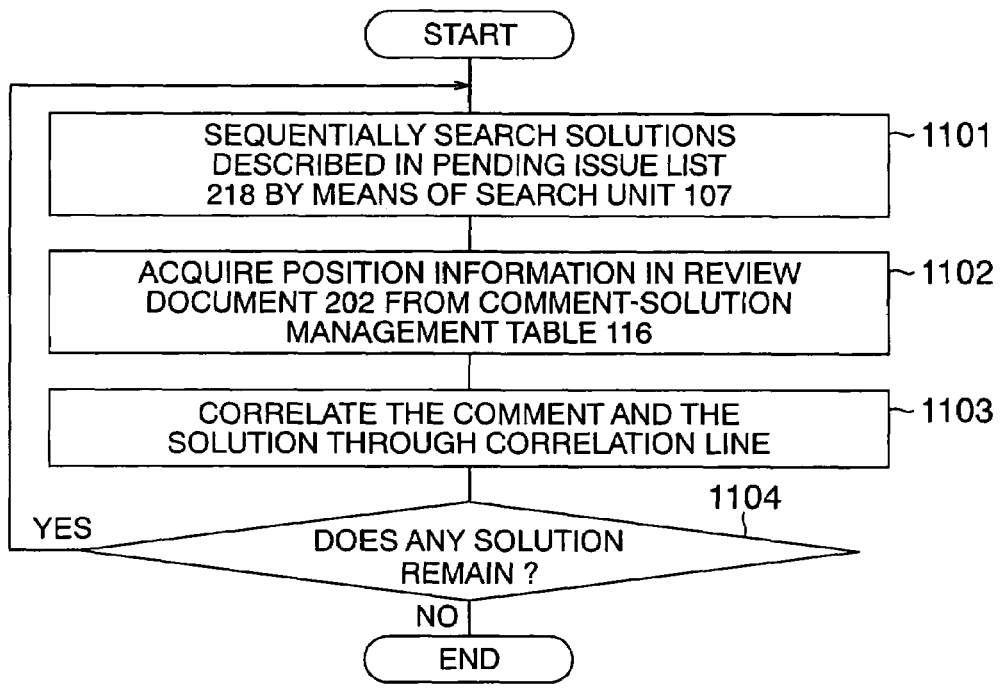
FIG. 11 shows the flow of a process for displaying a solution described in a pending issue list 218 while correlating it to the review document 202.

Referring to FIG. 11, there is illustrated the flow of a process for reflecting the solution filled in the pending issue list 218 upon the review object document 202. In step 1101, solutions described in the pending issue list 218 are sequentially retrieved by means of the search unit 107. In step 1102, position information in the review object document 202 is acquired from the comment-solution management table 116. In step 1103, comments are correlated to solutions through correlation lines by means of the solution reflecting unit 108. In step 1104, it is decided whether any solution remains and if so, the program returns to the step 1101 but if not so, the process ends.

Reverting to FIG. 2, when a solution described in the pending issue list 218 is selected on the pending issue management editing screen 217, a corresponding range in the review object document 202 is specified and displayed emphatically on the review object document editing screen 201.

Figure 12:
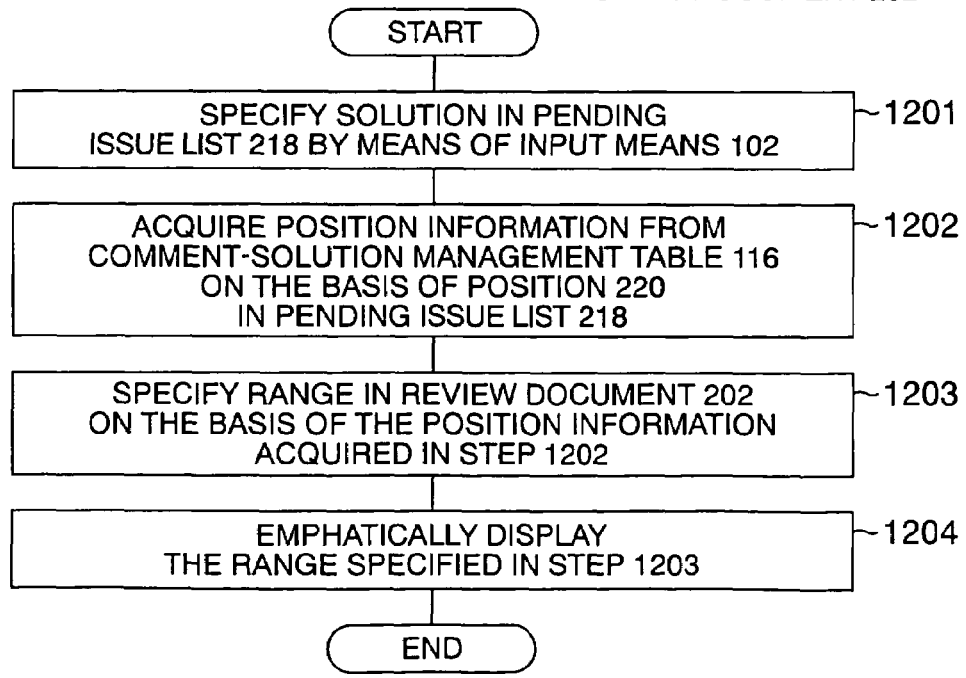
FIG. 12 shows the flow of a process for selecting a solution in the pending issue list 218 and emphatically displaying a corresponding comment range in the review document 202.

With a solution in the pending issue list 218 selected, a corresponding comment range in the review object document 202 and the solution are emphatically displayed in accordance with a process flow as shown in FIG. 12. In step 1201, the input unit 102 specifies a solution in the pending issue list 218. In step 1202, position information is acquired from the comment-solution management table 116 on the basis of a position 220 in pending issue list 218 at the specified position acquired in the step 1201. In step 1203, a range in the review object document 202 is specified on the basis of the position information acquired in the step 1202. In step 1204, the range specified in the step 1203 is displayed emphatically. Conversely to the above, when a range in which a comment is post-scribed to the review object document 202 is selected on the review object document editing screen 201, a corresponding solution described in the pending issue list 218 can be specified and can be displayed emphatically on the pending issue management editing screen 217.

Figure 13:
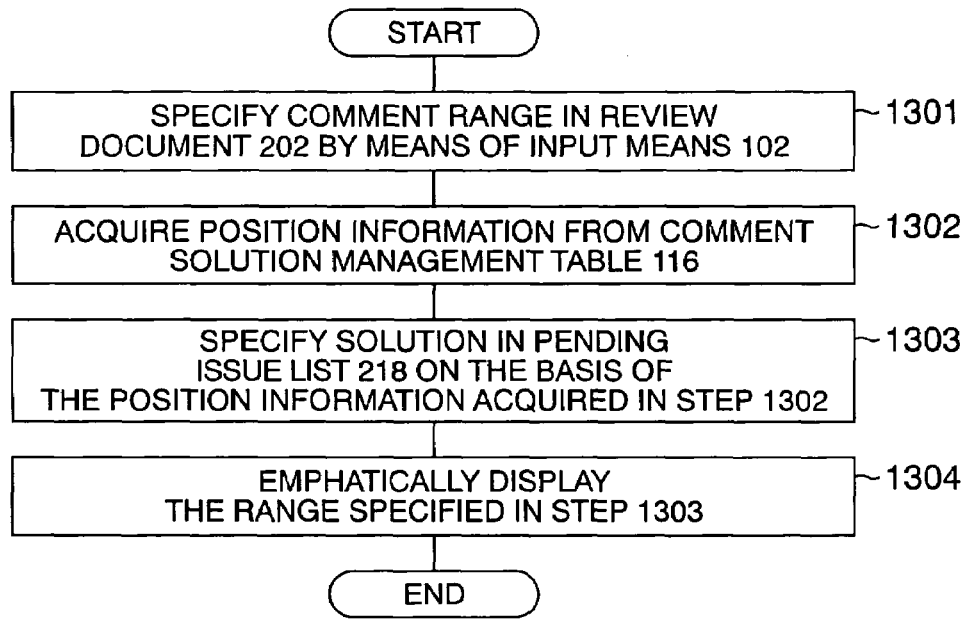
FIG. 13 shows the flow of a process for selecting a comment range in the review document 202 and emphatically displaying a corresponding solution in the pending issue list 218.

With the comment range in the review object document 202 selected, a corresponding solution in the pending issue list 218 is emphatically displayed in accordance with a process flow as shown in FIG. 13. In step 1301, the input unit 1301 specifies a comment range in the review object document 202. In step 1302, position information is acquired from the comment-solution management table 116 on the basis of the comment specified in the step 1301. In step 1303, a solution in the pending issue list 218 is specified on the basis of the position information acquired in the step 1302. In step 1304, a range specified in the step 1303 is displayed emphatically.

Reverting to FIG. 2, when a comment described in the minutes 210 is selected on the minutes editing screen 209, a corresponding solution in the pending issue list is specified and displayed emphatically on the pending issue list editing screen 217.

Figure 14:
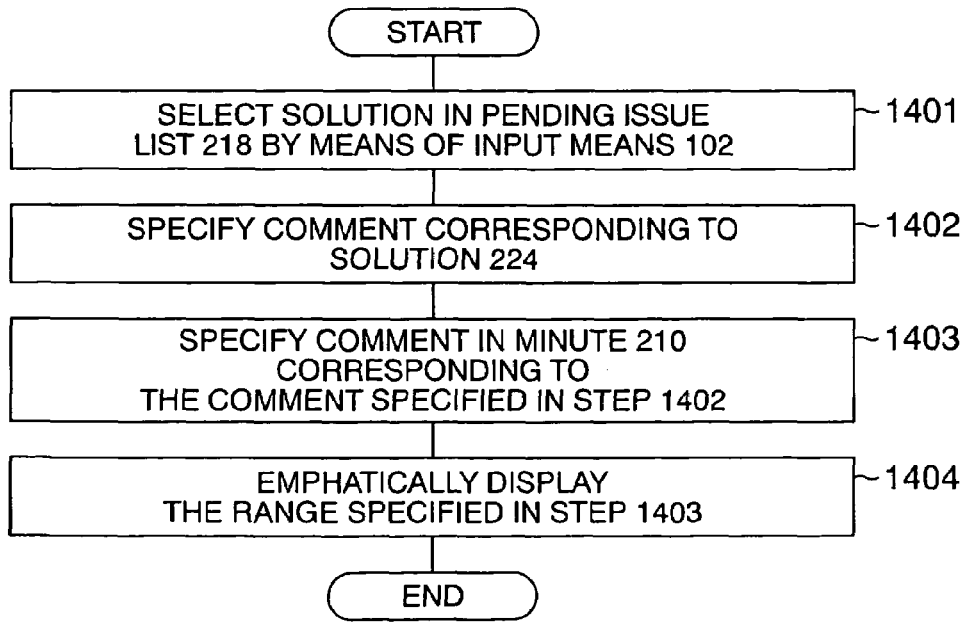
FIG. 14 shows the flow of a process for selecting a comment in the minutes 210 and emphatically displaying a corresponding solution in the pending issue list 218.

Referring to FIG. 14, there is illustrated the flow of a process for selecting a comment in the minutes 210 and emphatically displaying a corresponding solution for the pending issue list. In step 1401, the input unit 102 selects a solution in the pending issue list 218. In step 1402, a comment for solution 224 is specified. In step 1403, a comment in minutes 210 corresponding to the comment specified in the step 1402 is specified. In step 1404, a range specified in the step 1403 is emphatically displayed.

By using means as above, a series of work operations of comment to the review object document 202, review, preparation of the minutes 210 and preparation of the pending issue list 218 can be carried out cooperatively. In addition, since correlated information such as information about a solution against a comment can be displayed immediately on the editing screen, work of correcting the review object document 202 can be done very smoothly. In case correction work is applied to the review object document 202, the difference from the state before correction must be managed. In a second embodiment of the invention to be described below, the difference management for the review object document 202 will be dealt with.

Next, the second embodiment of the invention will be described.

Figure 15:
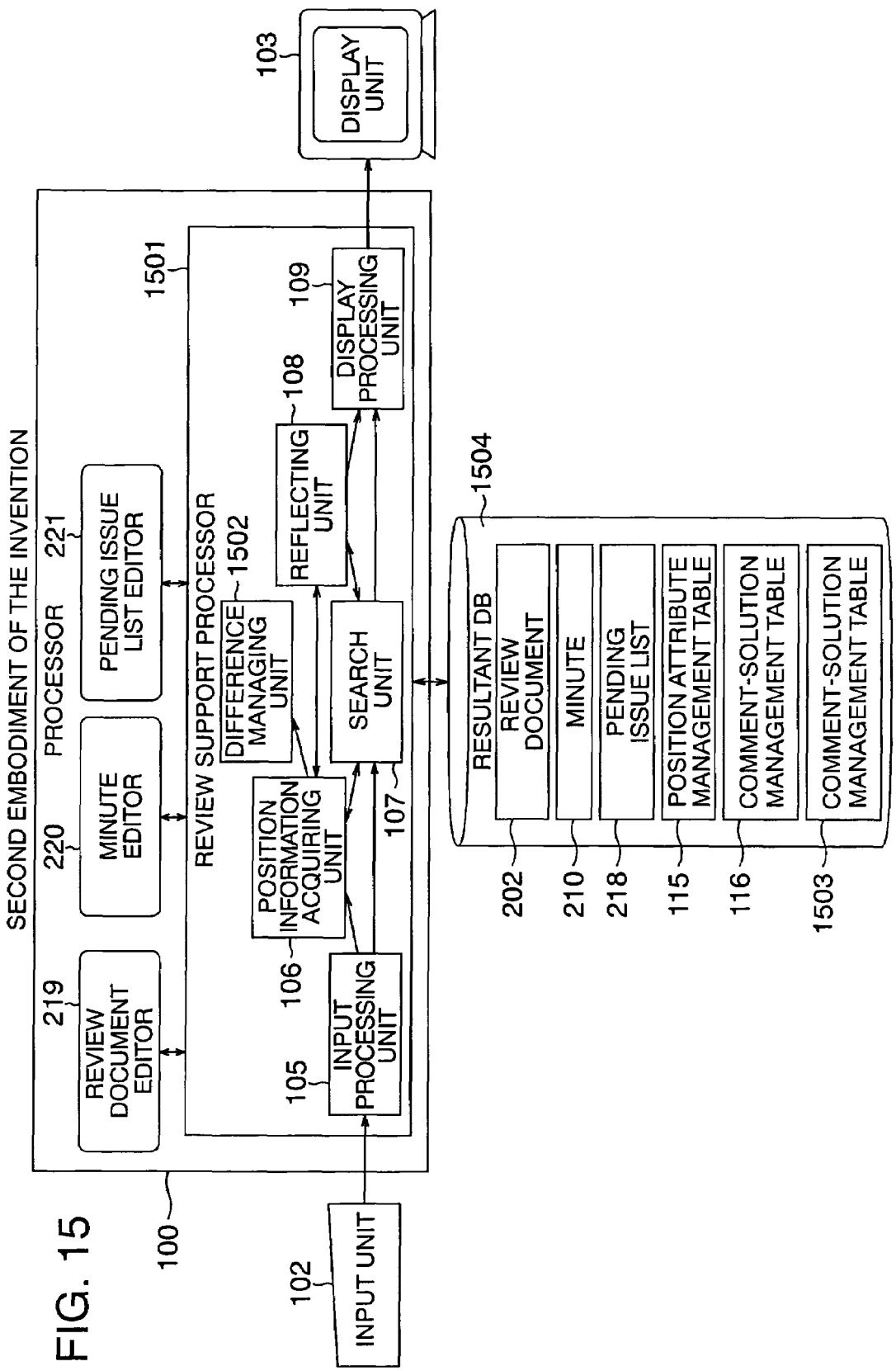
FIG. 15 shows the construction of an apparatus according to a second embodiment of the invention.

Referring to FIG. 15, there is illustrated, in block diagram form, an apparatus according to the second embodiment of the invention. A review support processor 1501 differs from the review support processor 101 in that an internal process by a difference management unit 1502 is added. In addition, a resultant DB 1504 differs from the resultant DB 104 in that a difference management table 1503 is newly added.

An example of the difference management table 1503 is illustrated in FIG. 16. ID 1601 represents identifiers uniformly or definitely determined in the difference management table 1503. Object document 1602 is filled in with documents subjected to the difference management. Reflection position 1603 represents newly changed positions obtained through edition of a document indicated in the object document 1602, and concrete position information is managed with the comment-solution management table 116. Reflection source contents 1604 represents contents described at reflection position 1603 before correction. For example, difference information 1605 has an ID of "1", indicating that the object document is "DocA", the information at reflection position is "text A1" in the comment-solution management table 116 and the reflection source contents is "text A1".

Figure 17:
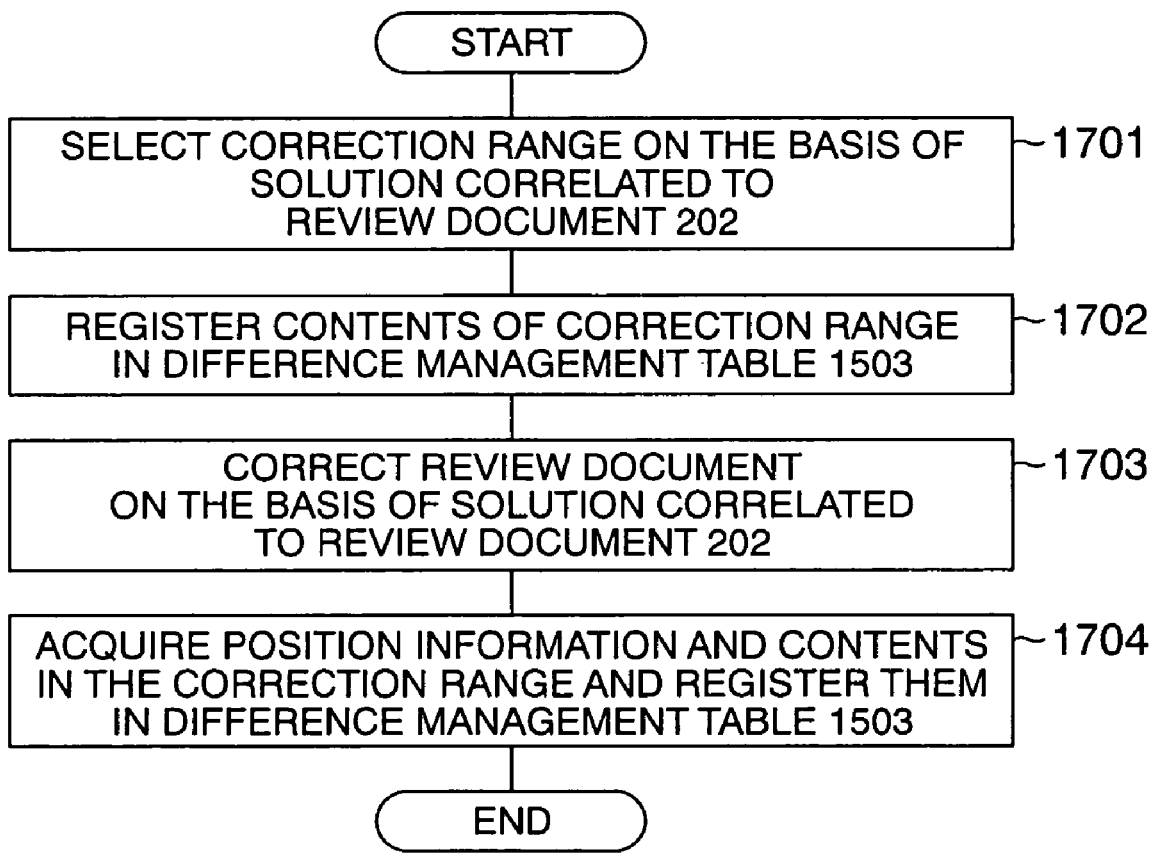
FIG. 17 shows the flow of a process for managing the difference.

A process flow of the difference management is shown in FIG. 17. In step 1701, a correction range is selected on the basis of a solution correlated to the review object document 202. In step 1702, the contents of the correction range is registered in the difference management table 1503. In step 1703, the review object document is corrected on the basis of a solution correlated to the review object document 202. In step 1704, position information and contents in the correction range are acquired and registered in the difference management table 1503.

Figure 18:
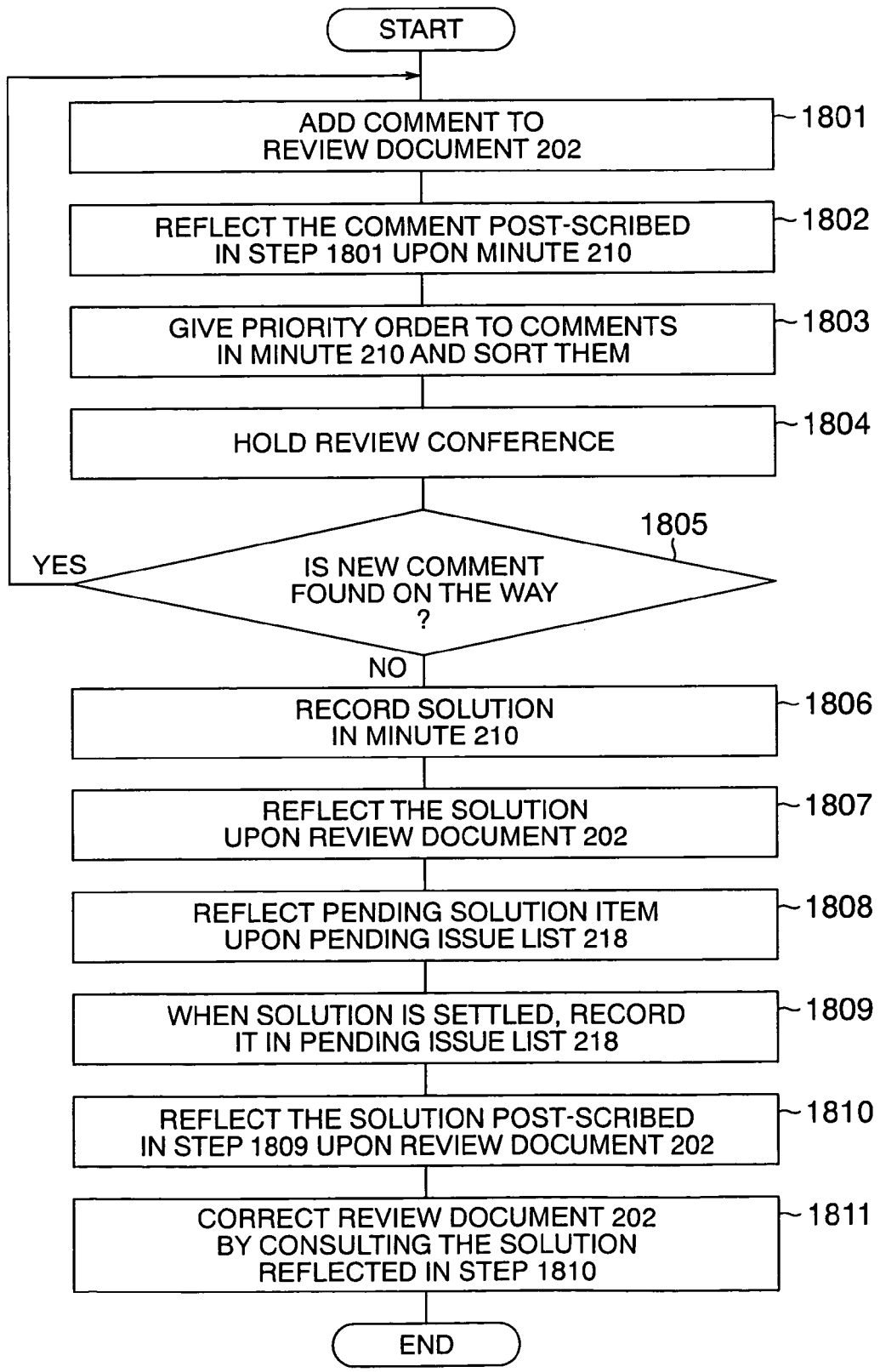
FIG. 18 shows the flow of reviewing in the invention.

Referring to FIG. 18, there is illustrated the flow of reviewing procedures including comment to the review object document, review, minutes book preparation, pending issue management and reflection upon the review object document set forth so far. In step 1801, a comment is added to the review object document 202. In step 1802, the comment post-scribed in the step 1801 is reflected upon the minutes 210. In step 1803, the priority order is given to the comment in the minutes 210 to sort it. In step 1804, a review conference is actually held. At that time, a discussion is held while cooperatively displaying a comment range in the review object document 202 and the comment in the minutes 210. In step 1805, when a new comment, which has not been described in the minutes 210, is found on the way, the program returns to the step 1801 to take the steps of post-scribing the new comment in the review object document and reflecting it upon the minutes 210. In step 1806, a solution is recorded on the minutes 210. In step 1807, the solution is reflected upon the review object document 202. In step 1808, pending solution items are reflected upon the pending issue list 218. In step 1809, if a solution is settled, it is recorded on the pending issue list 218. In step 1810, the solution post-scribed in the step 1809 is reflected upon the review object document 202. In step 1811, the review object document 202 is corrected by consulting the solution reflected in the step 1810.

As described above, the reviewing procedures can be carried out by cooperating the review object document 202, minutes 210 and pending issue list 218 while using the comment and solution as key. By merely writing information in a specified document, the information can be reflected upon all correlated documents and besides correlative information can be displayed on the editing screen, with the result that efficient review can be executed. But, as far as the foregoing description is concerned, the present invention does not presuppose that there are a plurality of review object documents to which comments are post-scribed. Then, means for carrying out review efficiently will be studied which can enable many reviewers to participate in the comment and permits many comments to be discussed to thereby improve the quality of the review object document and put together comments from plural reviewers with high efficiency.

Figure 19:
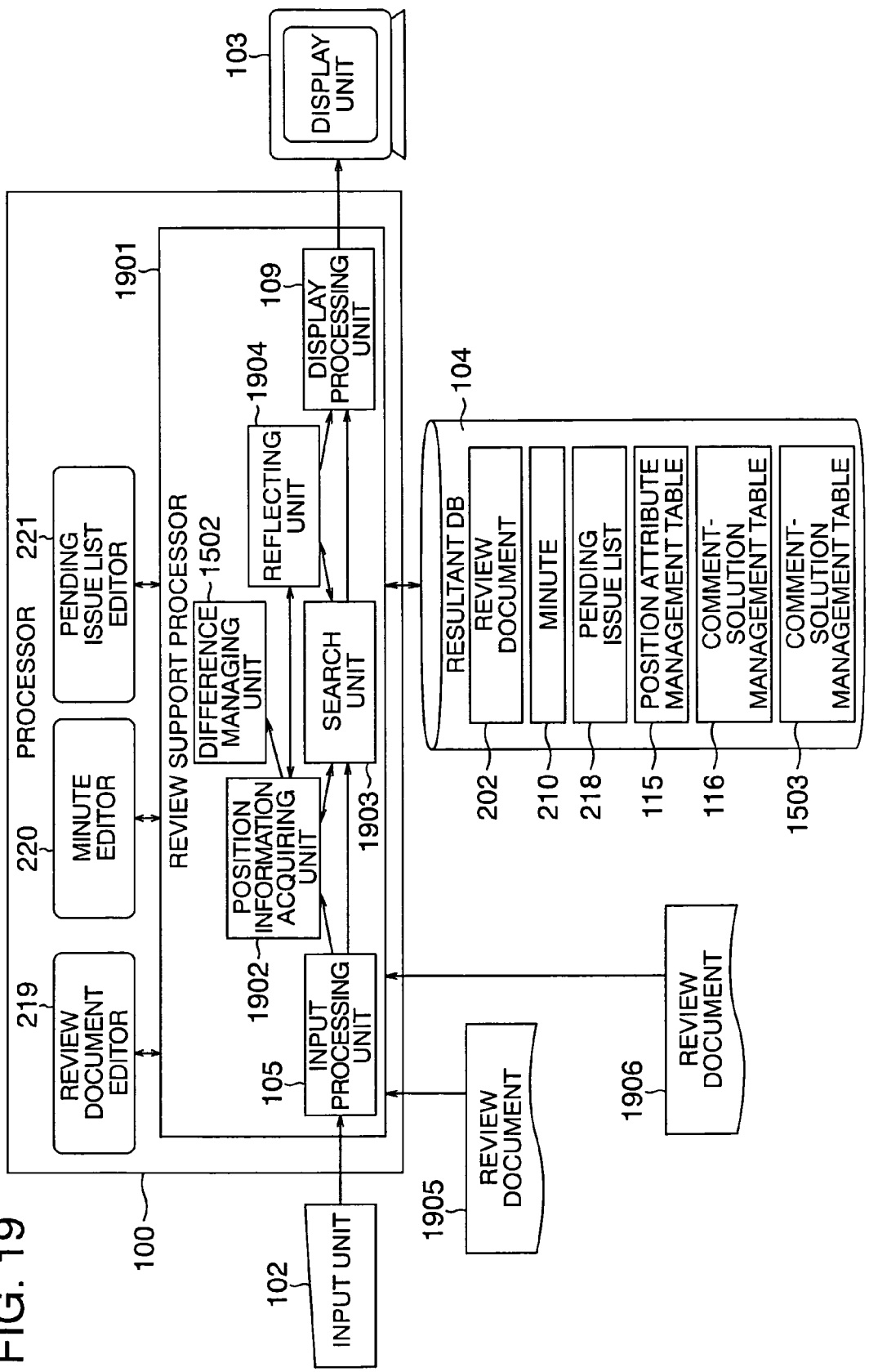
FIG. 19 shows the construction of an apparatus according to a third embodiment of the invention.

Referring to FIG. 19, there is illustrated an apparatus according to a third embodiment of the invention. A review support processor 1901 substitutes for the review support processor 101. The essential construction remains unchanged but for the purpose of collecting comments from a plurality of reviewers, position information acquiring unit 1902, searching unit 1903 and reflecting unit 1904 substitute for the position information acquiring unit 106, search unit 107 and reflecting unit 108, respectively. Individual reviewers separately post-scribe comments to the review object document 202 to provide review object documents 1905 and 1906. Comments post-scribed to the review object documents 1905 and 1906 are collected to the minutes 210.

Figure 20:
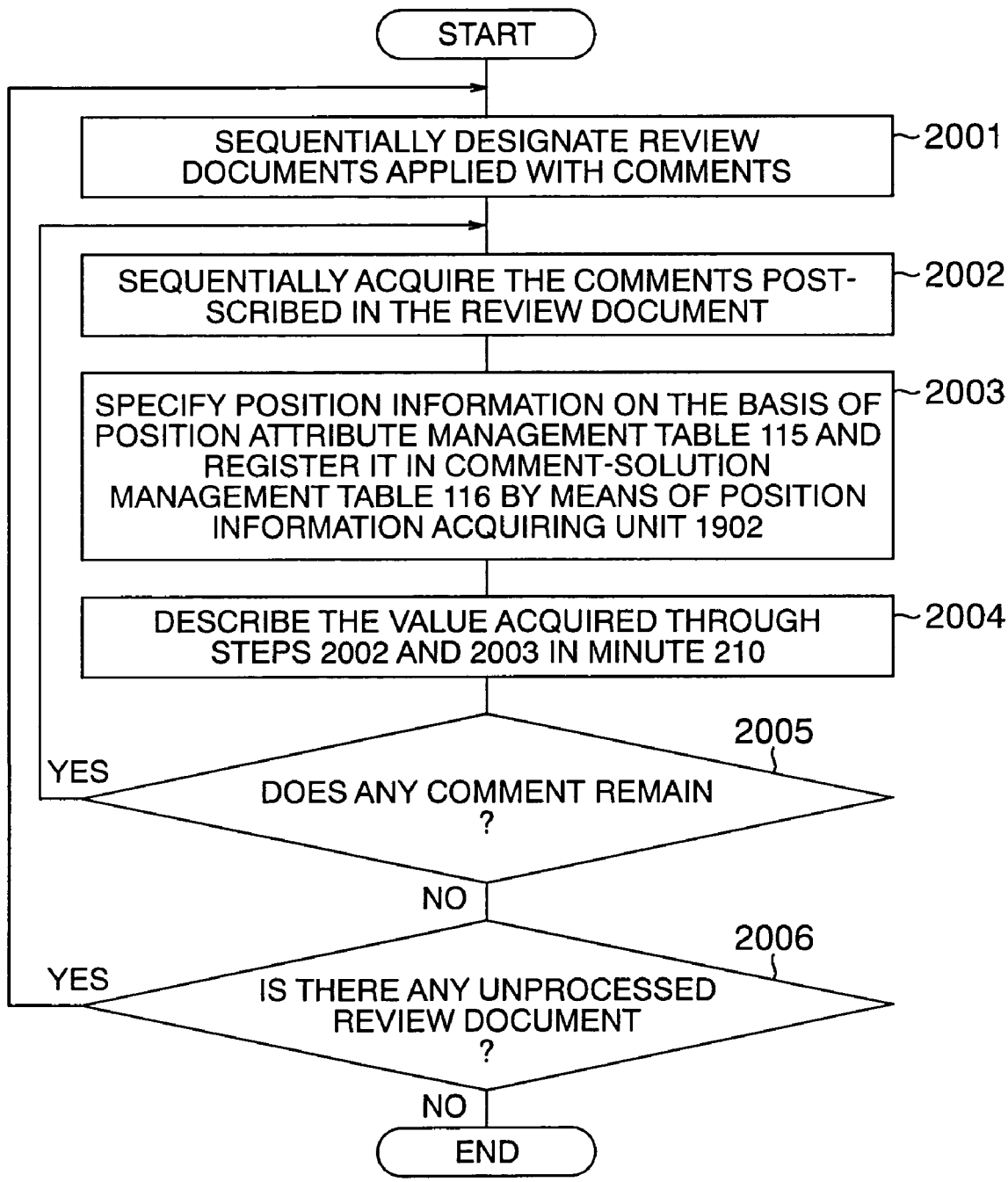
FIG. 20 shows the flow of a process for reflecting comments form a plurality of reviewers upon the minutes 210 in the invention.

The flow of a process for reflecting comments from plural reviewers upon the minutes 210 is illustrated in FIG. 20. In step 2001, review object documents applied with comments are designated sequentially. The review object documents applied with comments to be designated at that time may exist in an external storage connected through a network. In step 2002, the comments post-scribed in the review object documents are acquired sequentially. In step 2003, the position information acquiring unit 1502 specifies position information on the basis of the position attribute management table 115 and registers the specified position information in the comment-solution management table 116. In step 2004, values acquired through the steps 2002 and 2003 are described in the minutes 210. In step 2005, it is decided whether any unprocessed comments remain and if so, the program returns to the step 2002 but if not so, the program proceeds to step 2006. In the step 2006, it is decided whether any unprocessed review object documents remain and if so, the program returns to the step 2001 but if not so, the process ends. In the above, comments from the plurality of reviewers are reflected upon the minutes 210 but the reflected comments can also be reflected upon the review object document 202 through the same process as the process flow for reflection of solutions as shown in FIG. 10.

An example of merging comments from the plurality of reviewers to the review object document 202 is illustrated in FIG. 21. In a review object document 2101 applied with comments, a comment 2105 is post-scribed in a comment range 2104 and a comment 2107 is post-scribed in a comment range 2106. Similarly, in a review object document 2102 applied with comments, a comment 2108 is post-scribed in a comment range 2106 and a comment 2110 is post-scribed in a comment 2109. These comments are merged into a review object document 2103. The comment ranges 2104, 2106 and 2109 are put together in the review object document 2103 and the comments 2105, 2107, 2108 and 2110 are correlated to these comment ranges. The comments 2107 and 2108 are correlated to the same comment range 2106.

As described above, for the benefit of a plurality of viewers, too, a series of work operations in review can be supported. The foregoing embodiments, however, presuppose that the review support processor 101 and review object document editor 219 operate on a single computer, failing to cause, for example, a computer A to edit the review object document and a computer B to operate the minutes. Accordingly, it is impossible for a reviewer staying at a remote location to participate in reviewing through a television conference, for instance. Then, operating the present invention on a plurality of computers will be studied.

Figure 22:
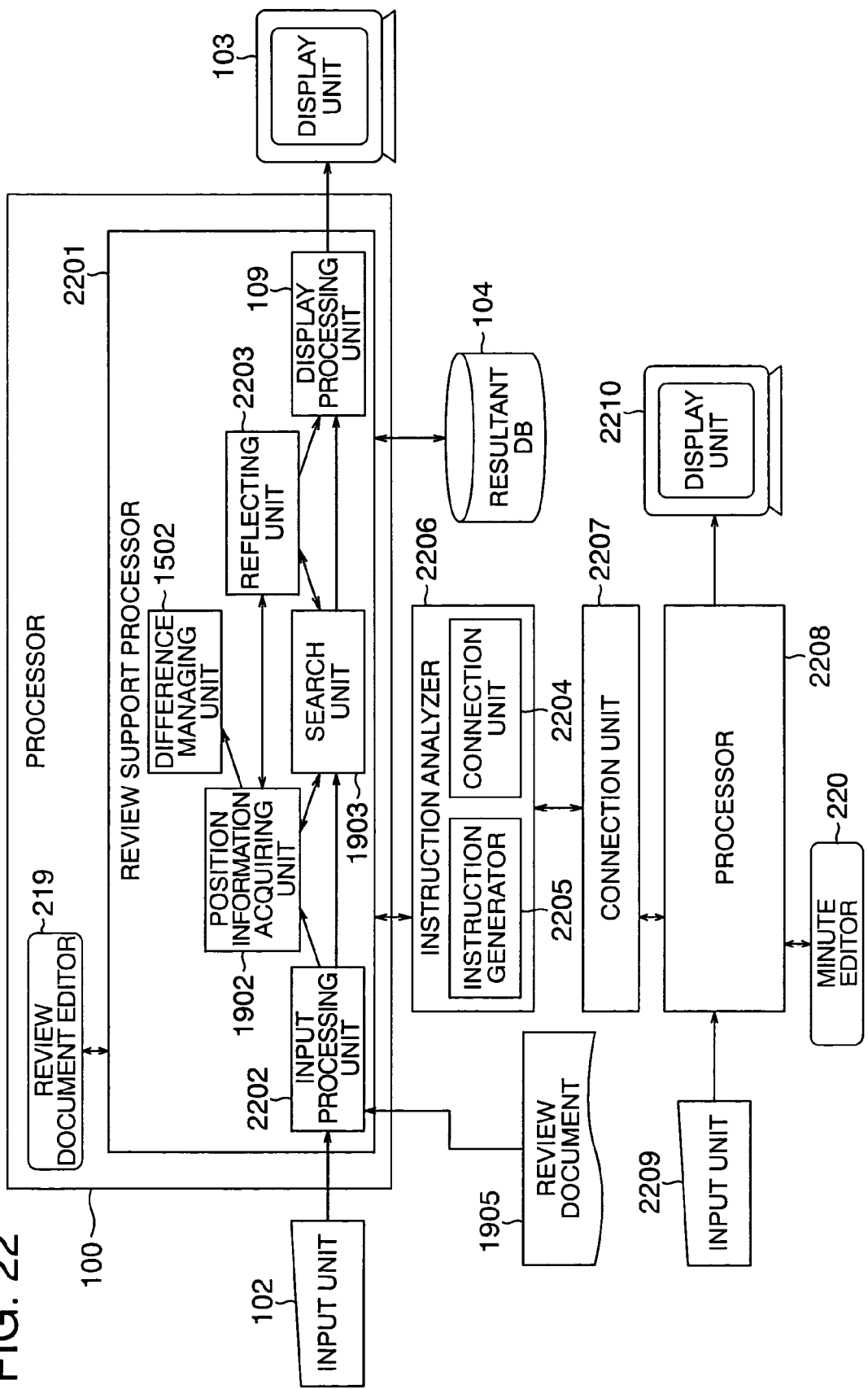
FIG. 22 shows the construction of an apparatus according to a fourth embodiment of the invention.

Referring to FIG. 22, an apparatus according to a fourth embodiment of the invention is illustrated. A review support processor 2201 substitutes for the review support processor 1901. For transmission of information among computers, input processing unit 2202 and reflecting unit 2203 substitute for the input processing unit 105 and reflecting unit 1904, respectively. Further, transmission of information to another computer is carried out through a connection unit 2204. In FIG. 22, the apparatus is connected to a processor 2208 on a different computer through a connection unit 2207. The connection unit is connectable to plural computers. Further, in FIG. 22, the review object document editor 219 cooperates with the processor 100 and the minutes editor 220 cooperates with the processor 2208. The connection unit 2204 is comprised of an instruction generator 2205 and an instruction analyzer 2206. The processors cooperate with each other by interchanging instructions.

Figure 23:
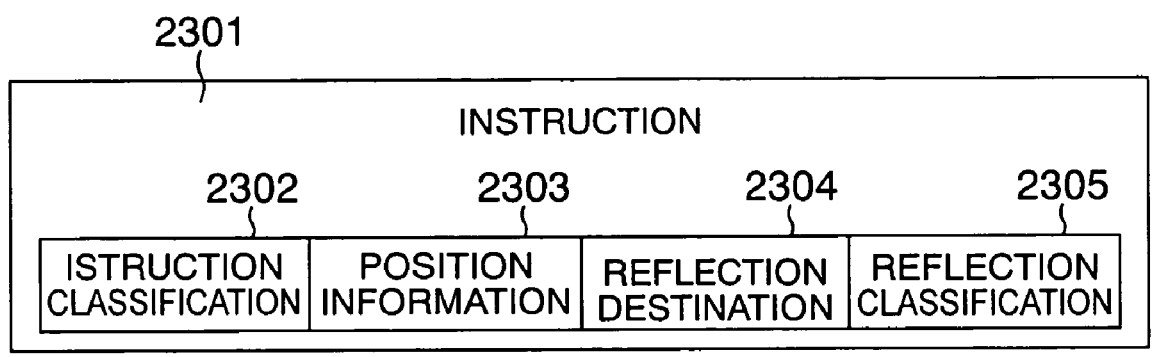
FIG. 23 shows an instruction 2301 in the invention.

An instruction 2301 is structured as shown in FIG. 23. Described in instruction classification 2302 is "reflection" or "display". Described in position information 2303 is position information for instructions, concrete values of which are managed by the comment-solution management table 116. Reflection destination 2304 represents a processor which executes the instruction 2301. Reflection classification 2305 indicates which subsystem the instruction is destined for.

Figure 24:
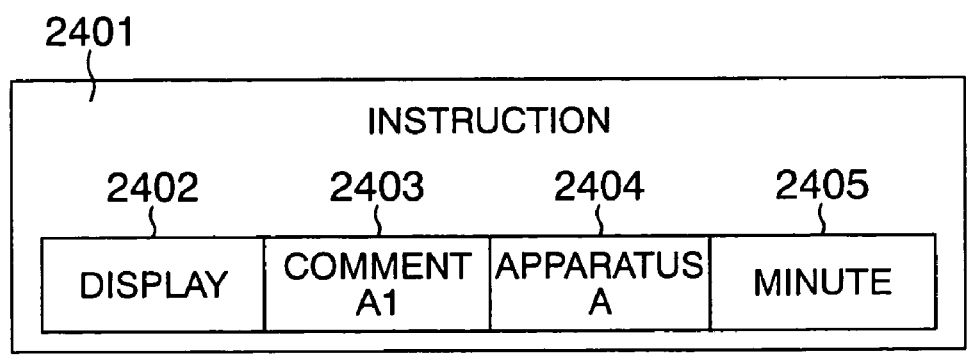
FIG. 24 shows an instruction 2401 in the invention.
Figure 25:
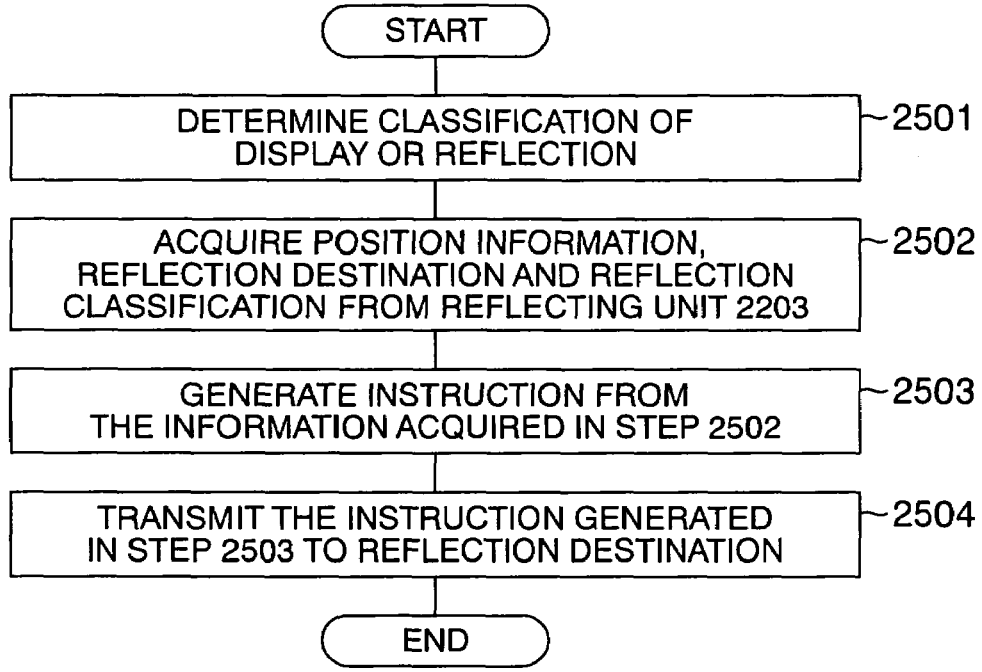
FIG. 25 shows the flow of a process for generating the instruction 2401 in the invention.
Figure 26:
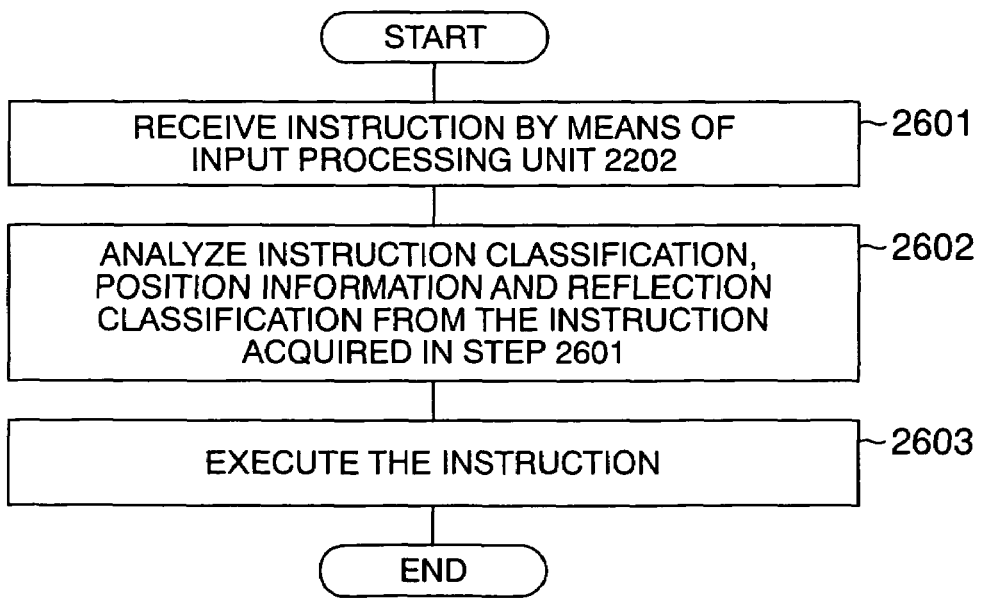
FIG. 26 shows the flow of a process for analyzing the instruction 2401 in the invention.

An example of an instruction 2401 is shown in FIG. 24. In the instruction 2401, "display" is indicated at instruction classification 2402, "comment A1" is indicated at position information 2403, "apparatus A" is indicated at reflection destination 2404 and "minutes" is indicated at reflection classification 2405. In other words, the instruction has such a meaning as "In connection with a minutes edition system operating in the apparatus A, display information corresponding to a position of the comment A1". The flow of a process for generating the instruction 2401 is shown in FIG. 25. In step 2501, the class of display or reflection is determined. In step 2502, the position information, reflection destination and reflection classification are acquired from the reflecting unit 2203. In step 2503, an instruction is generated from the information acquired in the step 2502. In step 2504, the instruction generated in the step 2503 is transmitted to the reflection destination. The flow of a process for analyzing the instruction 2401 is shown in FIG. 26. In step 2601, the input processing unit 2202 receives the instruction. In step 2602, the instruction classification, position information and reflection classification are analyzed from the instruction acquired in the step 2601. In step 2603, the instruction is executed.

According to the present embodiment, through the execution of the instruction, the comments post-scribed to the review object document are fetched into the minutes edition system and formatted into a table form. In the review conference, a discussion is proceeded with in accordance with the table and solutions are filled in. In case the contents of the review object document is desired to be confirmed during the review conference, the comment in the table is selected, so that a corresponding comment site can be emphatically displayed on the review object document edition system driven individually. Further, a comment newly generated during the review can be described in the review object document edition system so as to be reflected upon the minutes edition system on real time base. A comment for which any conclusion is not made during the review conference is automatically reflected upon the pending issue management system. Thereafter, when an item for which a solution is settled is described in the pending issue management system, the solution is reflected upon the corresponding site in the review object document. Accordingly, the object document can be reviewed on real time base. Further, by merely inputting the comment and solution directly to a single object system, the information can be reflected upon correlated systems and therefore, work of mail notification, for example, is not required. In addition, by cooperating with a system for editing the review object document, minutes and pending issue management through a network, the review can be executed on real time base even among reviewers staying at distributed locations.

According to the foregoing embodiments of the invention, systems for review object document, minutes preparation and pending issue management can be operated cooperatively. Information on the comment and solution can also be reflected upon inter-systems and can be displayed cooperatively. Also, comments from a plurality of reviewers can be merged. In addition, the cooperative process can be carried out even on a plurality of computers connected mutually. Through this, advantages in the following (A) to (D) can be expected.

(A) A series of work operations such as review, minutes preparation, pending issue list preparation and correction of the review object document can be carried out efficiently.

(B) Review by a plurality of reviewers at remote locations can be permitted.

(C) Even information of a different system correlated to review can be displayed and acquired immediately and hence efficient review can be executed.

(D) Omission of reflection of the comment and solution can be prevented and therefore, the improved quality of the review object document can be expected.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A document review support apparatus for supporting a review of a document, comprising:
   a storage which stores position-attribute management information defining items of position information to be acquired from a document to be reviewed, said position-attribute management information being stored independently from said document to be reviewed;
   an input unit which receives, from a user, an input including a designation of a position in said document to be reviewed at which a comment is to be added to comments currently associated with said document to be reviewed, and said comment;
   an acquiring unit, responsive to said input from said input unit, which acquires said position information from a position designated by said user in accordance with said position-attribute management information in said storage and stores, as an entry to comment-solution management information defining a comment and a solution to the comment, said position information and said comment to be added in said storage such that said position information and comment information of said comment to be added are correlated to each other;
   a search unit, coupled with said input unit and said acquiring unit, which searches, from the position-attribute management information and the comment-solution management information stored in said storage, said position information and said comments currently associated with said document to be reviewed; and
   a display unit, coupled with the search unit, which collectively displays at least position information, said comment to be added and comments currently associated with said document so as to correlate, on a display screen at positions indicated by said at least position information, said comments to be added and said comments currently associated with said document to each other.

2. A document review support apparatus according to claim 1, wherein said position-attribute management information defines classification of an application used during preparation of said document to be reviewed, classification of an object prepared by said application, and acquisition items of the position information in said document to be reviewed.

3. A document review support apparatus according to claim 1, further comprising:
   a reflecting unit for preparing minutes which correlate said comment to be added, said comments currently in said document to be reviewed and position information with said document to be reviewed and storing said minutes in said storage.

4. A document review support apparatus according to claim 3, further comprising:
   an editor which, in response to input of a solution comment corresponding to a comment in said minutes, searches a comment coincident with said comment corresponding to said solution comment and stores said solution comment in said storage by correlating it to said searched comment.

5. A document review support apparatus according to claim 1, wherein said acquiring unit stores in said storage a plurality of items of said position information and a plurality of items of comments by correlating them to each other.

6. A document review support apparatus according to claim 1, wherein the search unit searches, from the position-attribute management information and the comment-solution management information stored in said storage, position information, comment and solution associated with said review document, and the display unit displays the searched position information, comment and solution associated with said review document to correlate them with each other.

7. A document review support apparatus for supporting a review of a document, comprising:
   a storage which stores position-attribute management information defining items of position information to be acquired from a document to be reviewed, said position-attribute management information being stored independently from said document to be reviewed;
   an input unit which receives, from a user, an input including a designation of a position in said document to be reviewed at which a comment is to be added, and said comment;
   an acquiring unit, responsive to said input from said input unit, which acquires said position information from a position designated by said user in accordance with said position-attribute management information in said storage and stores, as an entry to comment-solution management information defining a comment and a solution to the comment, said position information and said comment in said storage such that said position information and said comment information are correlated to each other;
   a search unit, coupled with said input unit and said acquiring unit, which searches, from the position-attribute management information and the comment-solution management information stored in said storage, said position information and comment associated with said document to be reviewed;
   a display unit, coupled with the search unit, which collectively displays at least position information and a comment associated with said document so as to correlate said at least position information and the comment to each other;
   a reflecting unit for preparing minutes which correlate said comment and position information with said document to be reviewed and storing said minutes in said storage; and
   an instructing unit which, when a comment in said minutes is designated by said user, searches a comment coincident with said comment designated by said user from said storage, searches position information correlating to said retrieved comment and instructs an editor for editing of said document to be reviewed to highlight a position corresponding to said position information in said document to be reviewed.

8. A document review support apparatus for supporting a review of a document, comprising:

a storage which stores position-attribute management information defining items of position information to be acquired from a document to be reviewed, said position-attribute management information being stored independently from said document to be reviewed;

an input unit which receives, from a user, an input including a designation of a position in said document to be reviewed at which a comment is to be added, and said comment;

an acquiring unit, responsive to said input from said input unit, which acquires said position information from a position designated by said user in accordance with said position-attribute management information in said storage and stores, as an entry to comment-solution management information defining a comment and a solution to the comment, said position information and said comment in said storage such that said position information and said comment information are correlated to each other;

a search unit, coupled with said input unit and said acquiring unit, which searches, from the position-attribute management information and the comment-solution management information stored in said storage, said position information and comment associated with said document to be reviewed;

a display unit, coupled with the search unit, which collectively displays at least position information and a comment associated with said document so as to correlate said at least position information and the comment to each other;

a reflecting unit for preparing minutes which correlate said comment and position information with said document to be reviewed and storing said minutes in said; and an editor which, when a comment in said document to be reviewed is designated by said user, searches a comment coincident with said comment designated by said user and highlights a portion in said minutes corresponding to said searched comment.

9. A document review support apparatus for supporting a review of a document, comprising:

a storage which stores position-attribute management information defining items of position information to be acquired from a document to be reviewed, said position-attribute management information being stored independently from said document to be reviewed;

an input unit which receives, from a user, an input including a designation of a position in said document to be reviewed at which a comment is to be added, and said comment;

an acquiring unit, responsive to said input from said input unit, which acquires said position information from a position designated by said user in accordance with said position-attribute management information in said storage and stores, as an entry to comment-solution management information defining a comment and a solution to the comment, said position information and said comment in said storage such that said position information and said comment information are correlated to each other;

a search unit, coupled with said input unit and said acquiring unit, which searches, from the position-attribute management information and the comment-solution management information stored in said storage, said position information and comment associated with said document to be reviewed;

a display unit, coupled with the search unit, which collectively displays at least position information and a comment associated with said document so as to correlate said at least position information and the comment to each other; and a reflecting unit for preparing minutes which correlate said comment and position information with said document to be reviewed and storing said minutes in said storage, wherein when receiving an input of said comment, said input unit acquires identification information of said user and said reflecting unit inserts the identification information of said user to said minutes in correspondence to said comment.

10. A document review support apparatus according to claim 9, further comprising:

an editor for searching all comments and solution comments in said minutes from a specified range in a single document to be reviewed, correlating corresponding comment and solution comment to said single document to be reviewed and displaying said correlated comment and solution comment.

11. A document review support apparatus for supporting a review of a document, comprising:

a storage which stores position-attribute management information defining items of position information to be acquired from a document to be reviewed, said position-attribute management information being stored independently from said document to be reviewed;

an input unit which receives, from a user, an input including a designation of a position in said document to be reviewed at which a comment is to be added, and said comment;

an acquiring unit, responsive to said input from said input unit, which acquires said position information from a position designated by said user in accordance with said position-attribute management information in said storage and stores, as an entry to comment-solution management information defining a comment and a solution to the comment, said position information and said comment in said storage such that said position information and said comment information are correlated to each other;

a search unit, coupled with said input unit and said acquiring unit, which searches, from the position-attribute management information and the comment-solution management information stored in said storage, said position information and comment associated with said document to be reviewed;

a display unit, coupled with the search unit, which collectively displays at least position information and a comment associated with said document so as to correlate said at least position information and the comment to each other;

a reflecting unit for preparing minutes which correlate said comment and position information with said document to be reviewed and storing said minutes in said storage; and an editor for receiving a priority order of the comment described in said minutes from said user and assigning said priority order to said minutes by correlating it to said comment.

12. A document review support apparatus according to claim 11, wherein said editor sorts comments in said minutes based on said position information and said priority order.

13. A document review support apparatus for supporting a review of a document, comprising:
- a storage which stores position-attribute management information defining items of position information to be acquired from a document to be reviewed, said position-attribute management information being stored independently from said document to be reviewed;
- an input unit which receives, from a user, an input including a designation of a position in said document to be reviewed at which a comment is to be added, and said comment;
- an acquiring unit, responsive to said input from said input unit, which acquires said position information from a position designated by said user in accordance with said position-attribute management information in said storage and stores, as an entry to comment-solution management information defining a comment and a solution to the comment, said position information and said comment in said storage such that said position information and said comment information are correlated to each other;
- a search unit, coupled with said input unit and said acquiring unit, which searches, from the position-attribute management information and the comment-solution management information stored in said storage, said position information and comment associated with said document to be reviewed;
- a display unit, coupled with the search unit, which collectively displays at least position information and a comment associated with said document so as to correlate said at least position information and the comment to each other;
- a reflecting unit for preparing minutes which correlate said comment and position information with said document to be reviewed and storing said minutes in said storage;
- an editor which, in response to input of solution comments corresponding to comments in said minutes, assigns said solution comments to said minutes by correlating them to said comments; and
- a management unit for searching, in said minutes, comments not correlated to said solution comments, preparing a pending issue list which lists comments to which said solution comments are not correlated and storing said pending issue list in said storage.

14. A document review support apparatus according to claim 13, wherein when a comment in said minutes is designated by said user, said management unit searches, from said storage, a comment in said pending issue list which is coincident with said comment designated by said user and highlights a portion in said pending issue list which corresponds to said searched comment.

15. A document review support apparatus according to claim 13, wherein said management unit searches from said storage a comment corresponding to a solution comment in said pending issue list, searches from said storage a comment in said document to be reviewed which is coincident with said searched comment, and correlates the comment in said document to be reviewed to said comment in said pending issue list.

16. A document review support apparatus according to claim 15, wherein said management unit, in response to a comment or a solution comment in said pending issue list being designated by said user, searches from said storage a comment or a solution comment in said document to be reviewed which is coincident with said comment or said solution comment in said pending issue list, searches, from said storage, position information corresponding to said comment or solution comment in said document to be reviewed, and commands an editor, which edits said document to be reviewed, to highlight a position in said document to be reviewed which corresponds to said position information.

17. A document review support apparatus according to claim 15, wherein when a comment or a solution comment in said document to be reviewed is designated by said user, said management unit searches from said storage a comment or a solution comment in said pending issue list which is coincident with said comment or said solution comment in said document to be reviewed and highlights a portion in said pending issue list which corresponds to said comment or said solution comment in said pending issue list.

18. A document review support apparatus according to claim 15, further comprising:
- an editor for editing said document to be reviewed based on a comment or solution comment in said document to be reviewed; and
- a management unit for managing a change in said document to be reviewed before and after edition.

19. A method for supporting review of a document, comprising the steps of:
- storing, in a storage, position-attribute management information defining items of position information to be acquired from a document to be reviewed, as an entry to comment-solution management information defining a comment and a solution to the comment,
- receiving from an user an input of a designated position in said document to be reviewed at which a comment is to be added to comments currently associated with said document to be reviewed, and said comment;
- acquiring said position information from a position designated by said user in accordance with said position-attribute management information in said storage and storing, in said storage, as an entry to comment-solution management information defining a command and a solution to the comment, said position information and said comment to be added such that said position information and comment information of said comment to be added are correlated to each other;
- searching, from the position-attribute management information and the comment-solution management information stored in said storage, said position information and said comments currently associated with said document to be reviewed; and
- displaying at least position information, said comment to be added and comments currently associated with said document to be reviewed so as to correlate, on a display screen at positions indicated by said at least position information, said comment to be added and said comments currently associated with said document to be reviewed to each other.

20. A program, stored on a storage medium, for implementing a method of supporting a review of a document, said program when executed, causes a computer to perform the steps of:

storing management information defining items of position information to be acquired from a document to be reviewed;

receiving, from a user, an input of a designation of a position in said document to be reviewed at which a comment is to be added to comments currently associated with said document to be reviewed, and said comment;

acquiring said position information from the position designated by said user in accordance with said position-attribute management information in said storage and storing, as an entry to comment-solution management information defining a comment and a solution to the comment, said position information and said comment to be added in said storage such that said position information and comment information of said comment to be added are correlated to each other;

searching, from the position-attribute management information and the comment-solution management information stored in said storage, said position information and comments currently associated with said document to be reviewed; and collectively displaying at least position information, said comment to be added and comments currently associated with said document to be reviewed so as to correlate, on a display screen at positions indicated by said at least position information, said comment to be added and said comments currently associated with said document to be reviewed to each other.

\* \* \* \* \*